US008917000B2

(12) United States Patent
Yazaki et al.

(10) Patent No.: US 8,917,000 B2
(45) Date of Patent: Dec. 23, 2014

(54) ARRANGEMENT STRUCTURE OF CONNECTING CONDUCTOR CONNECTING INSIDE AND OUTSIDE CONDUCTORS OF MOTOR

(71) Applicant: Honda Motor Co., Ltd., Tokyo (JP)

(72) Inventors: Manabu Yazaki, Saitama (JP);
Nobuchika Ukai, Saitama (JP);
Masakazu Yoshii, Saitama (JP); Koichi Ono, Saitama (JP); Takehiro Endo, Saitama (JP); Masahiro Sato, Saitama (JP); Takahide Hashimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 13/681,051

(22) Filed: Nov. 19, 2012

(65) Prior Publication Data

US 2013/0137303 A1 May 30, 2013

(30) Foreign Application Priority Data

Nov. 24, 2011 (JP) .................................. 2011-256700
Nov. 24, 2011 (JP) .................................. 2011-256701

(51) Int. Cl.
*H02K 5/22* (2006.01)
*H01R 12/70* (2011.01)
(Continued)

(52) U.S. Cl.
CPC ............... *H01R 12/70* (2013.01); *H02K 16/00* (2013.01); *B60L 2220/46* (2013.01); *B60L 11/14* (2013.01); *B60L 2270/145* (2013.01); *H02K 7/006* (2013.01); *B60L 7/12* (2013.01); *B60L 11/123* (2013.01); *H02K 5/225* (2013.01); *B60L 2260/28* (2013.01); *Y02T 10/6217* (2013.01); *B60L 3/0061* (2013.01); *Y02T 10/70* (2013.01); *Y02T 10/7077* (2013.01); *B60L 2240/36* (2013.01); *H02K 7/116* (2013.01); *Y02T 10/641* (2013.01)
USPC .................................................. 310/71; 310/91

(58) Field of Classification Search
USPC .................................. 310/71, 91, 89; 439/926
See application file for complete search history.

(56) References Cited

U.S. PATENT DOCUMENTS 5,020,615 A * 6/1991 Asaoka ............................ 180/11
5,334,897 A * 8/1994 Ineson et al. ..................... 310/89
(Continued)

FOREIGN PATENT DOCUMENTS

CN 101884157 A 11/2010
JP 64-002561 U 1/1989
(Continued)

OTHER PUBLICATIONS

JP Office Action, Japanese Patent Application No. 2011-256701 issued on Sep. 3, 2013.

(Continued)

*Primary Examiner* — Burton Mullins
(74) *Attorney, Agent, or Firm* — Westerman, Hattori, Daniels & Adrian, LLP

(57) ABSTRACT

An arrangement structure includes: a motor including: a motor main body including a stator and a rotor, the rotor being disposed to be rotatable relative to the stator; a case member configured to store the motor main body; and a connecting conductor configured to electrically connect an inside conductor disposed inside the case member and an outside conductor disposed outside the case member; and a support device fixed to the case member and a frame member of a vehicle, the support device being configured to support the motor on the frame member, wherein the connecting conductor is arranged directly below a fixing portion where the support device is fixed to the case member.

26 Claims, 12 Drawing Sheets

(51) Int. Cl.
*B60K 6/20* (2007.10)
*H02K 16/00* (2006.01)
*B60L 11/14* (2006.01)
*H02K 7/00* (2006.01)
*B60L 7/12* (2006.01)
*B60L 11/12* (2006.01)
*B60L 3/00* (2006.01)
*H02K 7/116* (2006.01)

(56) References Cited

U.S. PATENT DOCUMENTS

| | | | | |
|---|---|---|---|---|
| 5,718,302 | A * | 2/1998 | Hasebe et al. | 180/65.6 |
| 6,664,678 | B2 * | 12/2003 | Shimizu | 310/71 |
| 7,002,271 | B2 * | 2/2006 | Reed et al. | 310/71 |
| 7,527,113 | B2 * | 5/2009 | Jenkins | 180/65.51 |
| 7,989,999 | B2 * | 8/2011 | Ono et al. | 310/71 |
| 8,522,909 | B2 * | 9/2013 | Niina | 180/299 |
| 2005/0206256 | A1 | 9/2005 | Reed et al. | |

FOREIGN PATENT DOCUMENTS

| | | |
|---|---|---|
| JP | 06-098494 A | 4/1994 |
| JP | 2004-320955 A | 11/2004 |
| JP | 2004-357432 A | 12/2004 |
| JP | 2006-211774 A | 8/2006 |
| JP | 2007-074848 A | 3/2007 |
| JP | 2008-206379 A | 9/2008 |
| JP | 2009-286303 A | 12/2009 |
| JP | 2010-239677 A | 10/2010 |
| WO | 2008/007806 A1 | 1/2008 |
| WO | 2013/077329 A1 | 5/2013 |

OTHER PUBLICATIONS

Japanese Decision to Grant a Patent issued Sep. 3, 2013, in counterpart Japanese Application No. 2011-256700 (5 pages including English translation).

* cited by examiner

ARRANGEMENT STRUCTURE OF CONNECTING CONDUCTOR CONNECTING INSIDE AND OUTSIDE CONDUCTORS OF MOTOR

BACKGROUND

1. Field of the Invention

The present invention relates to an arrangement structure of a connecting conductor connecting inside and outside conductors of a motor. Specifically the motor relates to a motor for use in an electric vehicle such as an electric car or a hybrid car, and the connecting conductor is configured to connect together the end portions of the inside and outside conductors of the motor.

2. Description of the Related Art

An electric vehicle such as an electric car or a hybrid car includes a motor for driving the vehicle, while conductive cables for connecting electric power to the motor from a drive apparatus or the like are arranged on the motor through a case member (see, for example, JP-A-H06-98494). Or, such conductive cables are connected to the motor through connectors (see, for example, JP-A-2007-74848).

In the vehicle motor cables' connecting apparatus disclosed in JP-A-H06-98494, electrically insulating bushes are fitted into through holes penetrating the upper case wall of a motor case, conductive adapter terminals are fitted into the bushes to constitute a connecting conductor connecting inside and outside conductors, and the end portions of the conductive cables provided inside and outside the motor case are connected together by the connecting conductor.

The vehicle driving motor cables' connecting structure disclosed in JP-A-2007-74848 includes a soundproof structure arranged such that it covers the vehicle room side surfaces of the connectors mounted on the case member of the motor. This soundproof structure includes a shield plate and a sound absorbing member respectively disposed opposed to the vehicle room side surfaces of the connectors, thereby reducing noises generated due to vibrations.

However, in the cables connecting apparatus of JP-A-H06-98494, since the connecting conductor is disposed on the upper portion of the motor, when a foreign body happens to drop down onto them from above the motor, there is a fear that the connecting conductor can be damaged by the foreign body. Also, when the motor is disposed under the floor of the vehicle, it is difficult to gain access to the connecting conductor disposed on the upper portion of the motor. Therefore, the apparatus has room for further improvement from the viewpoint of maintenance.

Here, in a vehicle with a motor disposed below a floor panel, when connectors are disposed in the lower half area of the motor, there is a possibility that the input of external force applied from below can act on the connectors and cables following them. Therefore, the connectors and cables require protection. However, the vehicle driving motor cables' connecting structure disclosed in JP-A-2007-74848 aims at reducing noises by covering the vehicle room side surfaces of the connectors with the shield plate and sound absorbing member but does not aim at protecting the connectors and cables.

SUMMARY

The invention is developed in view of the above problems and thus its object is to provide an arrangement structure of a connecting conductor, connecting inside and outside conductors of a motor, which allows access to the connecting conductor from the lower side of a vehicle even while a motor is left carried on the vehicle to thereby enhance the assembling and maintaining efficiency thereof and also can protect the connecting conductor against external force applied from above. Also, another object is to provide an arrangement structure which can reduce the input of external force applied to the connecting conductor disposed in the lower half area of the motor to thereby protect the connecting conductor.

In attaining the above objects, a first aspect of the invention provides an arrangement structure including: a motor including: a motor main body including a stator (for example, in the below-mentioned embodiment, stators 14A, 14B) and a rotor (for example, in the below-mentioned embodiment, rotors 15A, 15B), the rotor being disposed to be rotatable relative to the stator; a case member (for example, in the below-mentioned embodiment, a case 11) configured to store the motor main body; and a connecting conductor (for example, in the below-mentioned embodiment, connectors 101A, 101B) configured to electrically connect an inside conductor (for example, in the below-mentioned embodiment, bus bars 130) disposed inside the case member and an outside conductor (for example, in the below-mentioned embodiment, conductive cables 103A, 103B) disposed outside the case member; and a support device (for example, in the below-mentioned embodiment, mount members 13a, 13b) fixed to the case member and a frame member (for example, in the below-mentioned embodiment, a sub frame 13) of a vehicle, the support device being configured to support the motor on the frame member, wherein the connecting conductor is arranged below a fixing portion (for example, in the below-mentioned embodiment, a boss portion 11a) where the support device is fixed to the case member.

In a second aspect of the invention, in addition to the structure of the first aspect, at least a part of the connecting conductor is arranged directly below the support device in a vertical direction.

In a third aspect of the invention, in addition to the structure of the second aspect, at least a part of the connecting conductor is arranged directly below the frame member in the vertical direction.

In a fourth aspect of the invention, in addition to the structure of any one of the first to third aspects, the connecting conductor is arranged below a horizontal plane passing through a rotation axis (for example, in the below-mentioned embodiment, a rotation axis x) of the motor.

In a fifth aspect of the invention, in addition to the structure of any one of the first to fourth aspects, a longitudinal length of the vehicle is set larger than a lateral length of the vehicle; and the connecting conductor is arranged on one of a forward side surface of the case member and a backward side surface of the case member.

In a sixth aspect of the invention, in addition to the structure of the fifth aspect, the connecting conductor is arranged on one of the forward side surface (for example, in the below-mentioned embodiment, a forward side surface 11f) and the backward side surface, which is closer to a center of the vehicle in a longitudinal direction of the vehicle.

In a seventh aspect of the invention, in addition to the structure of anyone of the first to sixth aspects, the vehicle includes an auxiliary machine (for example, in the below-mentioned embodiment, an oil pump 70) fixed to the case member; and the connecting conductor is arranged on a portion located near both of the auxiliary machine and the support device.

In an eighth aspect of the invention, in addition to the structure of the seventh aspect, the auxiliary machine is arranged on a portion that is displaced from a portion located directly below the connecting conductor in the vertical direction.

In a ninth aspect of the invention, in addition to the structure of any one of the first to eighth aspects, a lower-most portion (for example, in the below-mentioned embodiment, the lower-most portions 105a) of the connecting conductor is arranged above a lower-most portion (for example, in the below-mentioned embodiment, the lower-most portion 113a) of the case member.

In a tenth aspect of the invention, in addition to the structure of any one of the first to ninth aspects, the motor is arranged below a floor panel (for example, in the below-mentioned embodiment, a floor panel 171) of the vehicle.

In an eleventh aspect of the invention, in addition to the structure of any one of the first to tenth aspects, a lower surface of the case member is formed with an opening (for example, in the below-mentioned embodiment, an opening 109) formed to allow communication between an inside of the case member and an outside of the case member; and a connecting portion (for example, in the below-mentioned embodiment, a connecting portion 132) configured to connect the connecting conductor with the inside conductor, wherein: the lower surface is arranged below the connecting conductor; and the opening is formed to allow visual confirmation of the connecting portion.

In a twelfth aspect of the invention, in addition to the structure of any one of the first to eleventh aspects, the connecting conductor includes: a conductor main body (for example, in the below-mentioned embodiment, a conductor main body 106); and a conductor hold portion (for example, in the below-mentioned embodiment, a conductor hold portion 107) formed separately from the case member, the conductor hold portion being configured to hold the conductor main body; and the connecting conductor is fixed to the motor by fixing the conductor hold portion to the case member.

In a thirteenth aspect of the invention, in addition to the structure of the first aspect, the motor includes: a left motor (for example, in the below-mentioned embodiment, a first motor 2A) arranged on a left side of a lateral direction of the vehicle, the left motor being configured to drive a left wheel (for example, in the below-mentioned embodiment, a rear wheel LWr) of the vehicle; and a right motor (for example, in the below-mentioned embodiment, a second motor 2B) arranged on a right side of the lateral direction, the right motor being configured to drive a right wheel (for example, in the below-mentioned embodiment, a rear wheel RWr) of the vehicle; the case member stores the left motor and the right motor; the support device includes: a left side support device (for example, in the below-mentioned embodiment, a mount member 13a) configured to support a left side of the case member; and a right side support device (for example, in the below-mentioned embodiment, a mount member 13b) configured to support a right side of the case member; the left side support device and the right side support device are fixed to one of a forward side surface (for example, in the below-mentioned embodiment, a forward side surface 11f) of the case member and a backward side surface of the case member; the connecting conductor includes a first connecting conductor corresponding to the left motor, at least a part of the first connecting conductor being arranged directly below the left side support device in the vertical direction; and the connecting conductor includes a second connecting conductor corresponding to the right motor, at least a part of the second connecting conductor being arranged directly below the right side support device in the vertical direction.

In a fourteenth aspect of the invention, in addition to the structure of the thirteenth aspect, the vehicle includes an auxiliary machine interposed between the first connecting conductor and the second connecting conductor, the auxiliary machine being fixed to the one of the forward side surface and the backward side surface of the case member.

In a fifteenth aspect of the invention, in addition to the structure of the first aspect, the arrangement structure further including a protector member (for example, in the below-mentioned embodiment, protector members 140A, 140B) arranged directly below the connecting conductor (for example, in the below-mentioned embodiment, outside connectors 105A, 105B and conductive cables 103A, 103B) in a vertical direction, the protector member being configured to cover a lower surface of the connecting conductor, wherein the connecting conductor extends from the case member at a portion located below a horizontal plane (for example, in the below-mentioned embodiment, a horizontal plane P) passing through a rotation axis (for example, in the below-mentioned embodiment, a rotation axis x) of the motor.

In a sixteenth aspect of the invention, in addition to the structure of the fifteenth aspect, the protector member extends in a direction away from the case member; and the protector member includes an inclining portion (for example, in the below-mentioned embodiment, an inclining portion 144) inclined so that a portion of the inclining portion, located far from the case member, is higher than a portion of the inclining portion, located near the case member.

In a seventeenth aspect of the invention, in addition to the structure of the sixteenth aspect, the protector member includes a communication structure configured to allow communication between an upper portion of the protector member and a lower portion of the protector member; and the communication structure is formed on a portion of the protector member located near the case member.

In an eighteenth aspect of the invention, in addition to the structure of the seventeenth aspect, the communication structure is formed by arranging the protector member so that a gap (for example, in the below-mentioned embodiment, a gap C) intervenes between the protector member and the case member.

In a nineteenth aspect of the invention, in addition to the structure of the fifteenth to eighteenth aspects, the protector member includes: a bottom portion (for example, in the below-mentioned embodiment, a bottom portion 142) configured to cover a lower surface of the connecting conductor; and an erect portion (for example, in the below-mentioned embodiment, an erect portion 143) extended upwardly in the vertical direction from an edge of the bottom portion.

In a twentieth aspect of the invention, in addition to the structure of the nineteenth aspect, the bottom portion includes a width reducing section (for example, in the below-mentioned embodiment, a width reducing section 145); and a width of a portion of the width reducing section, located far from the case member (for example, in the below-mentioned embodiment, the horizontal direction width W1), is narrower than a portion of the width reducing section, located near the case member (for example, in the below-mentioned embodiment, the horizontal direction width W2), in a horizontal direction.

In a twenty-first aspect of the invention, in addition to the structure of any one of the fifteenth to twentieth aspects, the protector member is formed separately from the case member, and is fixed to the case member through a support member (for example, in the below-mentioned embodiment, support members 160A, 160B); and the support member is formed separately from the case member and the protector member.

In a twenty-second aspect of the invention, in addition to the structure of the twenty-first aspect, the support member extends from one side of the connecting conductor to the other side of the connecting conductor, the support member being arranged above the connecting conductor and being fixed to the case member on the one side and the other side.

In a twenty-third aspect of the invention, in addition to the structure of any one of the fifteenth to twenty-second aspects, the lower-most portion (for example, in the below-mentioned embodiment, the lower-most portion 151) of the protector member is arranged above the lower-most portion (for example, in the below-mentioned embodiment, the lower-most portion 113a) of the case member.

In a twenty-fourth aspect of the invention, in addition to the structure of any one of the fifteenth to twenty-third aspects, the motor is supported by the frame member (for example, in the below-mentioned embodiment, a sub frame 13); and the connecting conductor is arranged below the frame member.

In a twenty-fifth aspect of the invention, in addition to the structure of any one of the fifteenth to twenty-fourth aspects, the motor is arranged below a floor panel (for example, in the below-mentioned embodiment, a floor panel 171) of the vehicle.

In a twenty-sixth aspect of the invention, in addition to the structure of any one of the fifteenth to twenty-fifth aspects, the vehicle includes an air flow control member (for example, in the below-mentioned embodiment, an air flow control member 170) extending in a substantially horizontal direction, the air flow control member being arranged below the lower-most portion of the motor and being configured to control the air flowing under the vehicle; and at least a part of the protector member is displaced from the air flow control member in the vertical direction.

Ina twenty-seventh aspect of the invention, in addition to the structure of any one of the fifteenth to twenty-sixth aspects, the vehicle includes an auxiliary machine (for example, in the below-mentioned embodiment, an oil pump 70) fixed to the outer surface of the case member; and the protector member includes an auxiliary machine protective portion (for example, in the below-mentioned embodiment, a coupler guard 148) extended from the protector member, the auxiliary machine protective portion being configured to cover the lower surface of the auxiliary machine.

According to the first aspect of the invention, since the connecting conductor is arranged below the support device, the connecting conductor can be accessed from the lower side of the vehicle while the motor is being fixed to the frame member by the support device, thereby being able to facilitate the assembling and maintenance of the connecting conductor and thus enhance the operation efficiency of the structure.

According to the second aspect of the invention, the support device can reduce impacts applied to the connecting conductor from above.

According to the third aspect of the invention, the frame member can further reduce the impacts applied to the connecting conductor from above.

According to the fourth aspect of the invention, since the connecting conductor is arranged on the lower half side of the motor, the connecting conductor can be easily accessed from below the motor.

According to the fifth aspect of the invention, when the rear wheel drive apparatus is carried on a vehicle, it is easier to have room for a space in the longitudinal direction than in the lateral direction and vertical direction. This can facilitate the smooth arrangement of the connecting conductor.

According to the sixth aspect of the invention, when external force is input to the vehicle from the longitudinal direction due to a collision or the like, the damage of the connecting conductor can be reduced further.

According to the seventh aspect of the invention, external force applied to the connecting conductor can be reduced by the support device and auxiliary machine, thereby being able to protect the connecting conductor.

According to the eight aspect of the invention, when the connecting conductor is accessed from the lower side of the motor, the auxiliary machine does not interfere with such access, thereby eliminating a possibility that the connecting operation efficiency of the connecting conductor can be impaired.

According to the ninth aspect of the invention, external force applied to the connecting conductor from below can be reduced.

According to the tenth aspect of the invention, even when the motor is arranged below the floor of the vehicle, the connecting conductor can be accessed easily. Also, an occupant space and a loading space on the floor can be expanded and the distance between the motor and wheel can be shortened.

According to the eleventh aspect of the invention, the connecting conductor can be connected to the inside conductor from the lower side of the motor.

According to the twelfth aspect of the invention, the connecting conductor can be fixed to the motor while omitting the operation to insert the conductor main bodies into the case member.

According to the thirteenth aspect of the invention, an increase in the length of the motor in the vertical direction and in the lateral direction can be reduced, thereby being able to make efficient use of a space.

According to the fourteenth aspect of the invention, in addition to the support device, the auxiliary machine can also protect the connecting conductor. Also, by interposing the auxiliary machine between the right and left connecting conductor, the auxiliary machine can be arranged efficiently.

According to the fifteenth aspect of the invention, the input of external force applied from below to the connecting conductor arranged in the lower half area of the motor is reduced by the protector member, thereby being able to protect the connecting conductor.

According to the sixteenth aspect of the invention, it is possible to reduce the entrance of a foreign body into the upper side of the protector member from the portion of the inclining portion located far from the case member. Also, in a collision or the like, the input of external force to the protective member from the remote side thereof due to peripheral members can be reduced.

According to the seventeenth aspect of the invention, foreign bodies such as small stones or water having entered the upper side of the protector member can be discharged easily, thereby being able to reduce the stay of the foreign bodies on the upper side of the protector member. Also, since foreign bodies having entered the protector member are caused to move to the portion of the protector member, located near the case member, due to the inclination of the inclining portion, they are easy to be discharged from the communication structure.

According to the eighteenth aspect of the invention, since the communication structure can be formed without opening up a hole in the protector member, the strength of the protector member can be enhanced. Also, since the contact portion between the case member and protector member, which provides a vibration source, is reduced, the transmission of vibrations to the protector member can be reduced.

According to the nineteenth aspect of the invention, since the erect portion can also cover the lateral side of the connecting conductor, the entrance of foreign bodies into the protector member from the lateral side thereof can be prevented. Also, when compared with a case where the protector member is formed in a flat plate shape, the strength is enhanced.

According to the twentieth aspect of the invention, since the protector member bottom portion includes the width reducing section in a state where the lateral side of the protector member is covered by the erect portion, foreign bodies are further difficult to enter the protector member.

According to the twenty-first aspect of the invention, without being restricted by the case member and support member, the protector member can be formed to have proper shape and thickness and also the protector member can be arranged at a proper position.

According to the twenty-second aspect of the invention, the protector member can be positively fixed to the case member by the support members fixed on both sides of the connecting conductor.

According to the twenty-third aspect of the invention, since external force applied from below is received by the case member, the input of an external force acting on the protector member can be reduced.

According to the twenty-fourth aspect of the invention, access to the connecting conductor from the lower side of the vehicle can be facilitated.

According to the twenty-fifth aspect of the invention, even when the motor is arranged below the floor, the connecting conductor can be accessed easily. Also, an occupant space and a loading space on the floor can be expanded, and the distance between the motor and wheel can be shortened.

According to the twenty-sixth aspect of the invention, with the air flow control member remaining mounted on the vehicle, the protector member and connecting conductor can be accessed easily.

According to the twenty-seventh aspect of the invention, the auxiliary machine can be protected by the protector member simultaneously. Also, when compared with a case where protector members for the connecting conductor and auxiliary machine are provided separately, the number of parts can be reduced, and the mounting and removal of the protector member can be simplified.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Now, in this embodiment, description is given below of an arrangement structure of a connecting conductor, connecting inside and outside conductors of a motor, according to the invention when it is applied to a vehicle drive apparatus having a motor serving as a wheel driving drive source. In the following description, there is taken an example in which the vehicle drive apparatus is used as a rear wheel drive apparatus. However, it may also be used as a front wheel drive apparatus.

Figure 1:
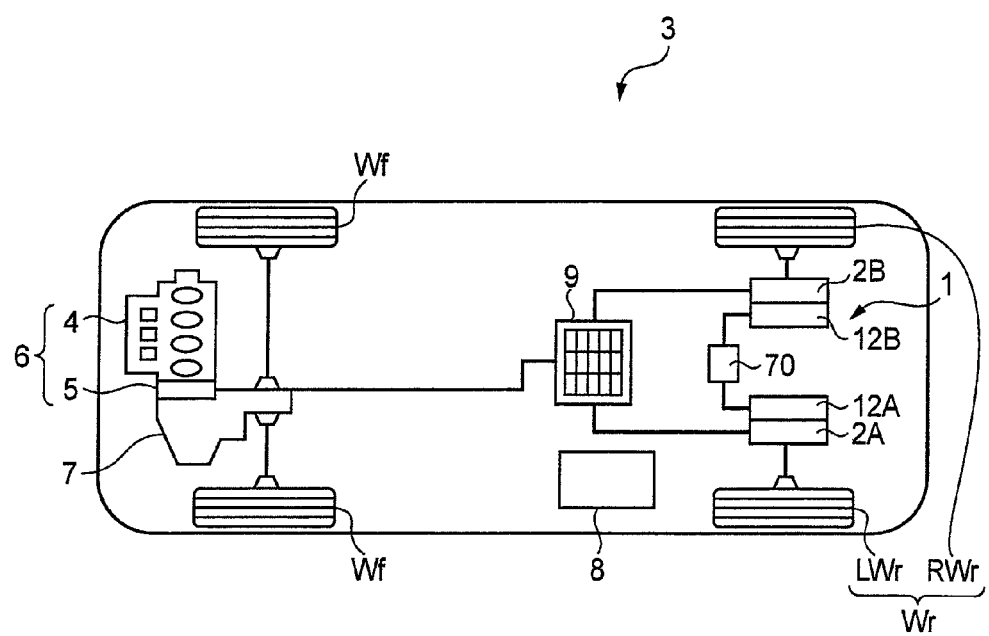
FIG. 1 is a block diagram of the schematic structure of a hybrid vehicle to which an arrangement structure of a connecting conductor, connecting inside and outside conductors of a motor, according to an embodiment of the invention is applied.

A vehicle 3 shown in FIG. 1 is a hybrid vehicle which includes in its front portion a drive apparatus 6 (which is hereinafter called a front wheel drive apparatus) having an internal engine 4 and a motor 5 connected in series, while the power of the front wheel drive apparatus 6 is transmitted through a transmission 7 to front wheels Wf. Here, separately from the front wheel drive apparatus 6, there is provided a drive apparatus 1 (which is hereinafter called a rear wheel drive apparatus) which is disposed below a floor panel 171 provided in the rear portion of the vehicle (see FIG. 12), while its power can be transmitted to rear wheels Wr (RWr, LWr). The rear wheel drive apparatus 1 includes first and second motors 2A and 2B, while the power of the first motor 2A is transmitted to the left rear wheel LWr and the power of the second motor 2B is transmitted to the right rear wheel RWr. The motor 5 of the front wheel drive apparatus 6 and the first and second motors 2A, 2B of the rear wheel drive apparatus 1 are connected to a battery 9, whereby power can be supplied from the battery 9 and energy can be regenerated into the battery 9. In FIG. 1, reference numeral 8 designates a control unit for controlling the whole of the vehicle.

Figure 2:
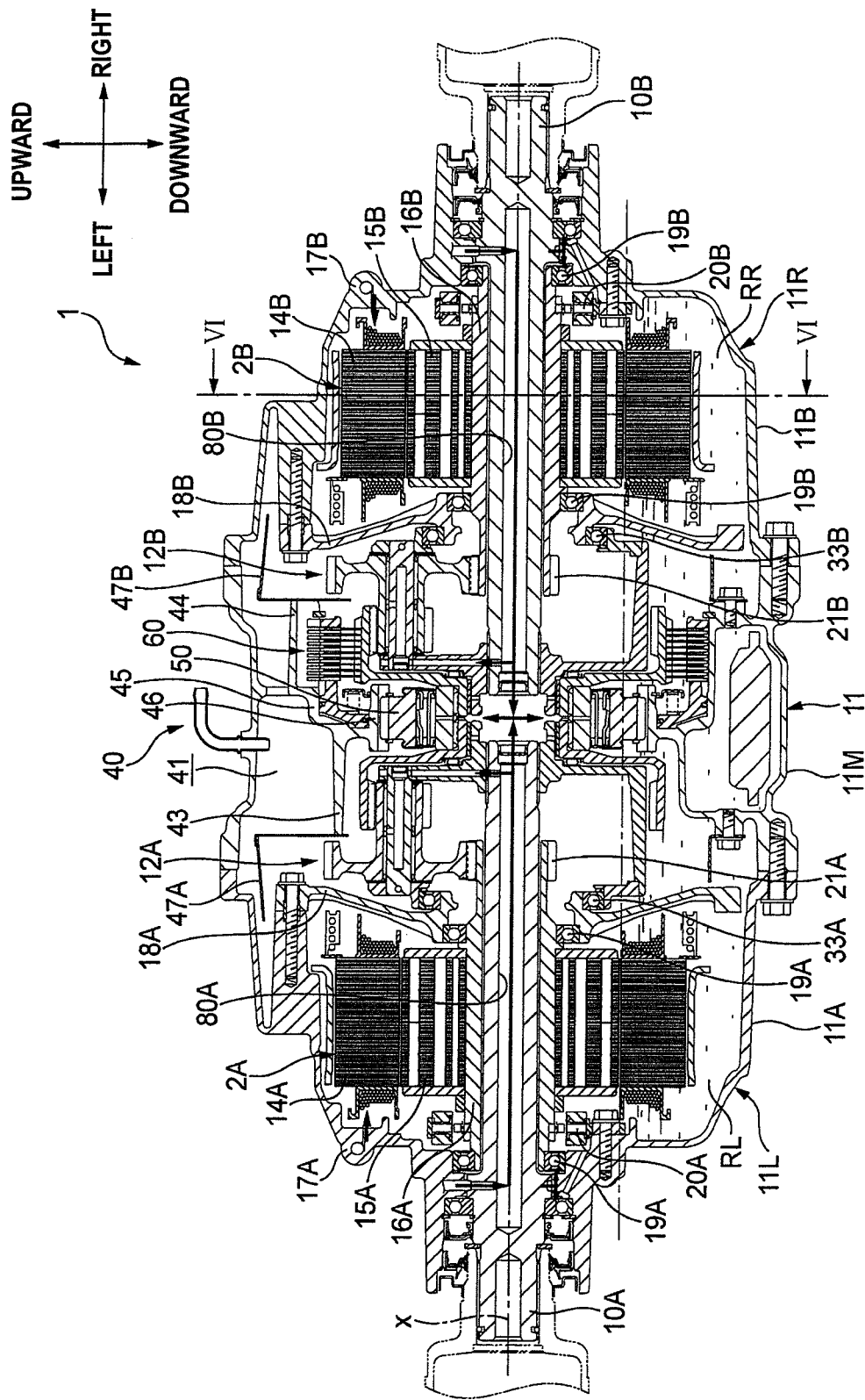
FIG. 2 is a longitudinal section view of a rear wheel drive apparatus having a motor.
Figure 3:
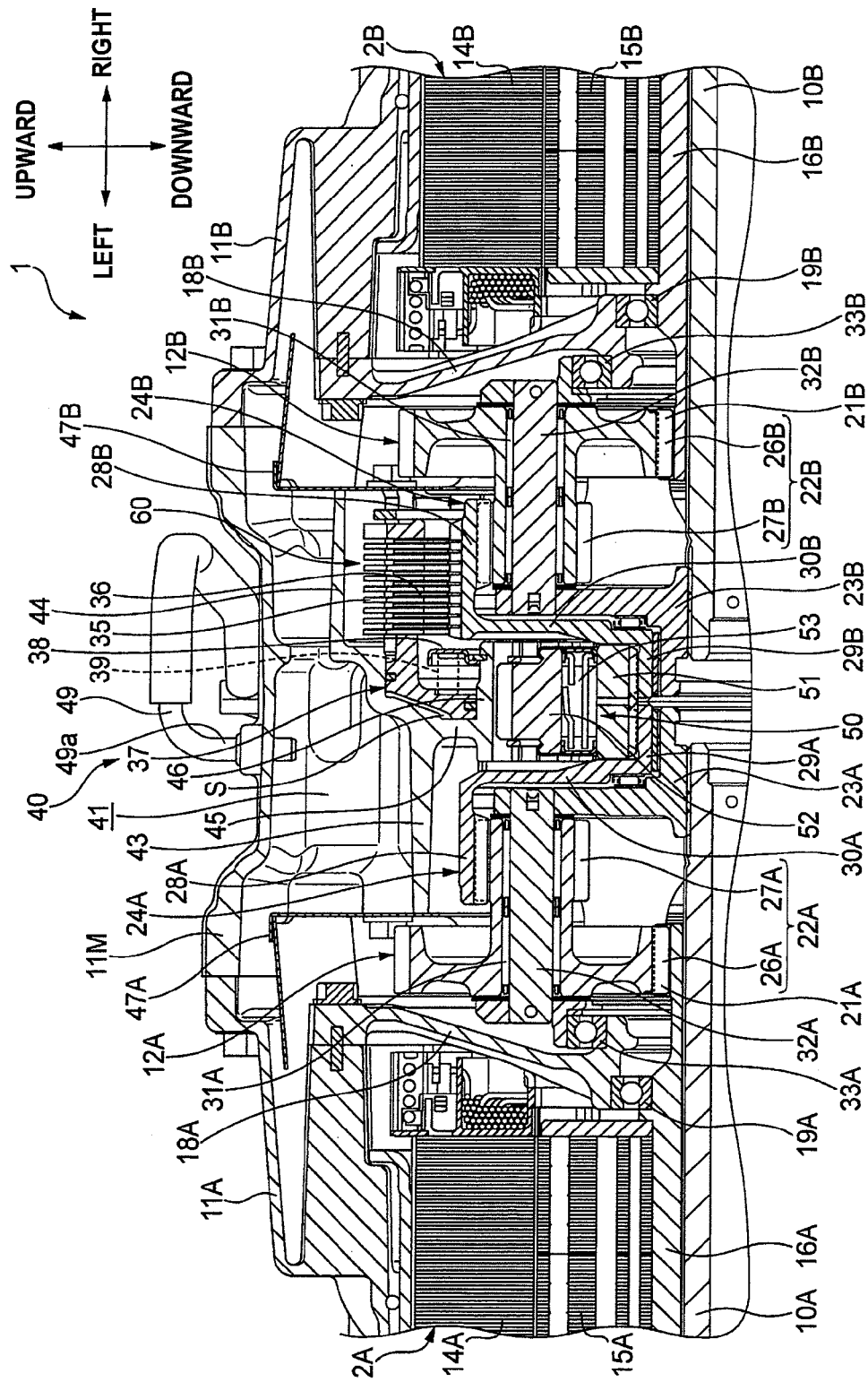
FIG. 3 is an enlarged section view of the upper portion of the rear wheel drive apparatus shown in FIG. 2.

FIG. 2 is a longitudinal section view of the whole of the rear wheel drive apparatus 1, and FIG. 3 is an enlarged section view of the upper portion of FIG. 2. A case 11, which serves as a case member of the rear wheel drive apparatus 1, includes a central case 11M disposed substantially in the central portion thereof in the vehicle width direction (which is hereinafter also called a vehicle lateral direction), and a left case 11A and a right case 11B respectively disposed right and left of the central case 11M in such a manner that they sandwich the central case 11M between them. The whole of the case 11 has a substantially cylindrical shape. Within the case 11, there are arranged axels 10A and 10B for the rear wheels Wr, first and second motors 2A and 2B for driving the axels, and first and second planetary gear type speed reducers 12A and 12B serving as first and second speed change gears for reducing the drive rotation of the motors 2A and 2B, while these parts are respectively situated side by side on the same axis. The axel 10A, first motor 2A and first planetary gear type speed reducer 12A are used to control the drive of the left rear wheel LWr; and, the axel 10B, second motor 2B and second planetary gear type speed reducer 12B are used to control the drive of the right rear wheel RWr. The axel 10A, first motor 2A and first planetary gear type speed reducer 12A are disposed symmetrically with respect to the axel 10B, second motor 2B and second planetary gear type speed reducer 12B respectively in the vehicle width direction within the case 11.

On the central case 11M sides of the side cases 11A, 11B, there are provided partition walls 18A, 18B respectively extending inwardly in the radial direction, while the first and second motors 2A, 2B are respectively interposed between the side cases 11A, 11B and partition walls 18A, 18B. Also, the first and second planetary gear type speed reducers 12A and 12B are disposed in a space surrounded by the central case 11M and partition walls 18A, 18B. As shown in FIG. 2, in this embodiment, the left side case 11A and central case 11M constitute a first case 11L for storing the first motor 2A and first planetary gear type speed reducer 12A; and, the right side case 11B and central case 11M constitute a second case 11R for storing the second motor 2B and second planetary gear type speed reducer 12B. The first case 11L has a left storage portion RL for storing oil serving as a liquid medium used to lubricate and/or cool at least one of the first motor 2A and power transmission route, while the second case 11R has a right storage portion RR for storing oil used to lubricate and/or cool at least one of the second motor 2B and power transmission route.

The rear wheel drive apparatus 1 includes a breather device 40 allowing communication between the inside and outside of the case 11, whereby the air existing inside the case 11 is allowed to escape to the outside through a breather chamber 41 in order to prevent the temperature and pressure of such air from increasing excessively. The breather chamber 41 is disposed in the vertically upper portion of the case 11 and is constituted of a space defined by the outer wall of the central case 11M, a first cylindrical wall 43 provided within the central case 11M and extended substantially horizontally toward the left side case 11A, a second cylindrical wall 44 extended substantially horizontally toward the right side case 11B, a right and left dividing wall 45 for connecting together the inside end portions of the first and second cylindrical walls 43, 44, a baffle plate 47A mounted in contact with the left side case 11A side leading end portion of the first cylindrical wall 43, and a baffle plate 47B mounted in contact with the right side case 11B side leading end portion of the second cylindrical wall 44.

Referring further to the first and second cylindrical walls 43, 44 and right and left dividing wall 45 respectively constituting the lower surface of the breather chamber 41, the first cylindrical wall 43 is situated inwardly of the second cylindrical wall 44 in the radial direction; and, the right and left dividing wall 45 is bent extended from the inner end portion of the second cylindrical wall 44 to the inner end portion of the first cylindrical wall 43 while reducing in diameter, and is further extended inwardly in the diameter direction to reach a third cylindrical wall 46 extended substantially horizontally. The third cylindrical wall 46 exists inwardly of the outer end portions of the first and second cylindrical walls 43 and 44 and also substantially centrally thereof.

The baffle plates 47A and 47B are respectively fixed to the central case 11M in such a manner that a space intervening between the first cylindrical wall 43 and the outer wall of the central case 11M or a space intervening between the second cylindrical wall 44 and the outer wall of the central case 11M is separated from the planetary gear type speed reducer 12A or the planetary gear type speed reducer 12B.

Also, in the central case 11M, an outside communication passage 49 for allowing communication between the breather chamber 41 and the outside is connected to the vertical-direction upper surface of the breather chamber 41. The breather chamber side end portion 49a of the outside communication passage 49 is disposed to face downwardly in the vertical direction. Therefore, oil is prevented from being discharged to the outside through the outside communication passage 49.

The stators 14A and 14B of the first and second motors 2A and 2B are respectively fixed to the side cases 11A and 113, while the circular rotors 15A and 15B thereof are respectively disposed on the inner peripheral sides of the stators 14A and 14B in such a manner that they can be rotated relatively to the stators 14A and 14B. Cylindrical shafts 16A and 16B, which respectively surround the outer peripheries of the axels 10A and 10B, are respectively connected to the inner peripheral portions of the rotors 15A and 15B, while these shafts 16A and 16B are respectively supported on the end walls 17A and 17B of the side cases 11A and 11B and the partition walls 18A and 18B through bearings 19A and 19B in such a manner that they can be rotated coaxially relative to the axels 10A and 10B. Also, on such portions of the end walls 17A and 17B as exist in the one-end side outer peripheries of the cylindrical shafts 16A and 16B, there are provided resolvers 20A and 20B for feeding back rotation position information about the rotors 15A and 15B to the controllers (not shown) of the motors 2A and 2B.

The first and second planetary gear type speed reducers 12A, 12B respectively include sun gears 21A, 21B, multiple planetary gears 22A, 22B engageable with the sun gears 21, planetary gears 23A, 23B for supporting the planetary gears 22A, 22B, and ring gears 24A, 24B engageable with the outer peripheral sides of the planetary gears 22A, 22B, wherein the drive forces of the motors 2A, 2B are input from the sun gears 21A, 21B and the reduced versions of the drive forces are output to the axels 10A, 10B through the planetary gears 23A, 23B.

The sun gears 21A, 21B are formed integrally with the cylindrical shafts 16A, 16B respectively. The planetary gears 22A, 22B are respectively double pinions which include large-diameter first pinions 26A, 26B engageable directly with the sun gears 21A, 21B and second pinions 27A, 27B having smaller diameter than the first pinions 26A and 26B. The first pinions 26A, 26B and second pinions 27A, 27B are formed integrally with each other, while they are offset coaxially in the axial direction. The planetary gears 22A, 22B are respectively supported through needle bearings 31A, 31B on the pinion shafts 32A, 32B of the planetary gears 23A, 23B. The axial-direction inner end portions of the planetary gears 23A, 23B respectively extend inwardly in the radial direction, are spline engaged with and supported by the axels 10A, 10B in such a manner that they can be rotated integrally with the axels 10A, 10B; and, the planetary gears 23A, 23B are also supported on the partition walls 18A and 18B through bearings 33A, 33B.

The ring gears 24A, 24B respectively include gear portions 28A, 28B having small-diameter inner peripheral surfaces and engageable with the smaller-diameter second pinions 27A, 27B, small-diameter portions 29A, 29B having smaller diameters than the gear portions 28A, 28B and disposed opposed to each other in the middle positions of the case 11, and connecting portions 30A, 30B for connecting the axial-direction inner end portions of the gear portions 28A, 28B to the axial-direction outer end portions of the small-diameter portions 29A, 29B in the radial direction.

The gear portions 28A, 28B are opposed to each other in the axial direction across a third cylindrical wall 46 formed in the inside diameter side end portion of the right-and-left dividing wall 45 of the central case 11M. The outer peripheral surfaces of the small-diameter portions 29A, 29B are respectively spline engaged with the inner race 51 of a one-way clutch 50 (which will be discussed later), while the ring gears 24A, 24B are connected to each other in such a manner that they can be rotated integrally with the inner race 51 of the one-way clutch 50.

On the planetary gear type speed reducer 12B side, between the second cylindrical wall 44 of the central case 11M constituting the case 11 and the gear portion 28B of the ring gear 24B, there is interposed an oil pressure brake 60 constituting brake means for braking the ring gear 24B in such a manner that it overlaps with the first pinion 26B in the radial direction and with the second opinion 27B in the axial direction. In the oil pressure brake 60, multiple fixed plates 35 spline engaged with the inner peripheral surface of the second cylindrical wall 44 and multiple rotary plates 36 spline engaged with the outer peripheral surface of the gear portion 28B of the ring gear 24B are disposed alternately in the axial direction, and these plates 35 and 36 can be fastened and released by an a circular piston 37. The piston 37 is stored advanceably and retreatably within a circular cylinder chamber formed between the right-and-left dividing wall 45 and third cylindrical wall 46 of the central case 11M and is normally energized in a direction to release the fixed plates 35 and rotary plates 36 by an elastic member 39 supported on a seat 38 provided on the outer peripheral surface of the third cylindrical wall 46.

More specifically, a space intervening between the right-and-left dividing wall 45 and piston 37 is used as an operation chamber S into which oil is introduced directly. When the pressure of oil introduced into the operation chamber S exceeds the energizing force of the elastic member 39, the piston 37 advances (moves to the right), whereby the fixed plates 35 and rotary plates 36 are pressed against and thus are fastened to each other. Also, when the energizing force of the elastic member 39 exceeds the pressure of oil introduced into the operation chamber, the piston 37 retreats (moves to the left), whereby the fixed plates 35 and rotary plates 36 are separated from each other and are thus released. Here, the oil pressure brake 60 is connected to an oil pump 70 (which will be discussed later) (see FIG. 4).

In the case of the oil pressure brake 60, since the fixed plates 35 are supported on the second cylindrical wall 44 extending from the right-and-left dividing wall 45 of the central case 11M constituting the case 11 and also the rotary plates 36 are supported on the gear portion 28B of the ring gear 24B, when the two plates 35, 36 are pressed against each other by the piston 37, the frictional fastening between the two plates 35, 36 applies a brake force to the ring gear 24B to thereby fix it. When the fastening by the piston 37 is released from this state, the ring gear 24B is allowed to rotate freely. Here, as described above, since the ring gears 24A, 24B are connected to each other, due to the fastening of the oil pressure brake 60, a brake force is also applied to the ring gear 24A to thereby fix it, whereas, when the oil pressure brake 60 is released, the ring gear 24A is also allowed to rotate freely.

Also, between the connecting portions 30A and 30B of the axially opposed ring gears 24A and 24B, there is also secured a space, where there is provided a one-way clutch 50 which transmits only one-direction power to the ring gears 24A, 24B but blocks other-direction power. The one-way clutch 50 is constituted of a large number of sprags 53 interposed between the inner race 51 and outer race 52, while the inner race 51 can be rotated integrally with the small-diameter portions 29A, 29B of the ring gears 24A, 24B due to its spline engagement with the portions 29A, 29B. Also, the outer race 52 is positioned and prevented against rotation by the third cylindrical wall 46.

The one-way clutch 50, when the vehicle 3 advances due to the power of the motors 2A, 2B, can be engaged with the ring gears 24A, 24B to thereby lock the rotation thereof. More specifically, when the rotational power of the motors 2A, 2B in the forward direction (the rotation direction when advancing the vehicle 3) is input to the wheel Wr side, the one-way clutch 50 is brought into engagement and, when the rotational power of the motors 2A, 2B in the reverse direction is input to the wheel Wr side, it is removed from engagement. When the rotational power of the wheel Wr in the forward direction is input to the motors 2A, 2B, the clutch 50 is disengaged and, when the rotational power of the wheel Wr in the reverse direction is input to the motors 2A, 2B, it is brought into engagement.

Figure 4:
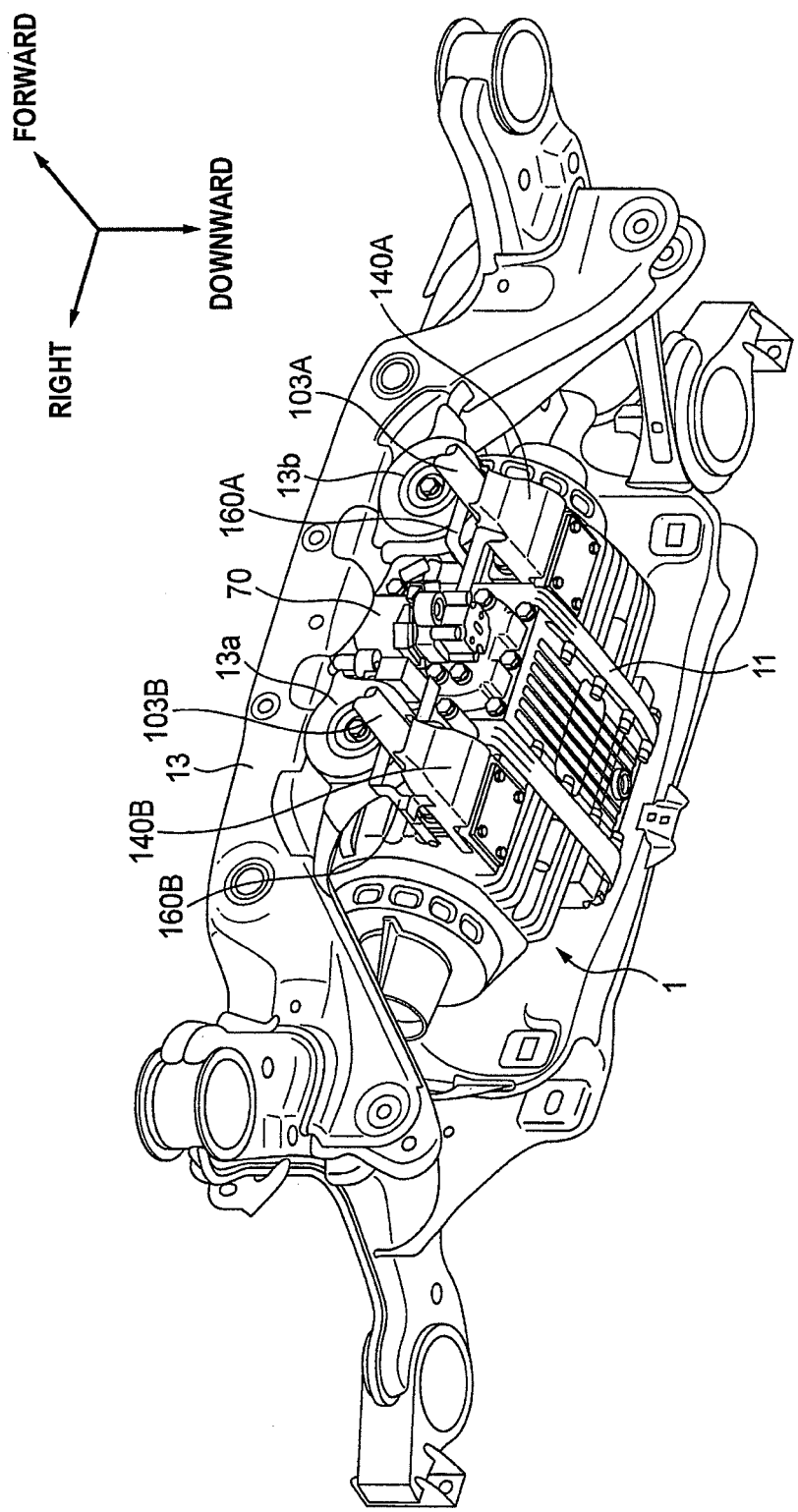
FIG. 4 is a perspective view of the rear wheel drive apparatus supported by a support device, when viewed from obliquely downward.

Also, as shown in FIG. 4, an oil pump 70 serving as an auxiliary machine is fixed to the forward side surface 11f of the central case 11M. The oil pump 70 is, for example, a trochoid pump and can be driven by a motor (not shown) such as a position-sensor-less/brushless dc motor. When driven, the pump 70 sucks oil stored in left and right storage portions RL, RR to lubricate and cool the respective portions through lubrication passages 80A, 80B formed in the respective mechanism parts such as the case 11 and axels 10A, 10B.

As described above, in the rear wheel drive apparatus 1 of this embodiment, the one-way clutch 50 and oil pressure brake 60 are arranged parallel on the power transmission route of the motors 2A, 2B and wheel Wr. Here, the oil pressure brake 60 can be controlled to a released state, a slightly fastened state and a fastened state by the pressure of oil supplied from the oil pump 70 according to the running state of the vehicle or the engaged and disengaged states of the one-way clutch 50. For example, when the vehicle 3 advances due to the power driving of the motors 2A, 2B (in the low speed time, and in the middle speed time), since the one-way clutch 50 is fastened, there is provided a power transmittable state. In this case, since the oil pressure brake 60 is controlled to the slightly fastened state, even when the input of the forward-direction rotation power from the motors 2A, 2B is lowered temporarily to thereby disengage the one-way clutch 50, power transmission failure between the motors 2A, 2B and wheels Wr can be prevented. Also, when the vehicle 3 advances due to the power driving of the internal engine 4 and/or motor 5 (in the high speed time), since the one-way clutch 50 is disengaged and the oil pressure brake 60 is controlled to the released state, the motors 2A, 2B can be prevented against over speed. On the other hand, in the backing time and regenerating time of the vehicle 3, since the one-way clutch 50 is disengaged and the oil pressure brake 60 is thereby controlled to the fastened state, the reverse-direction rotation power from the motors 2A, 2B is output to the wheels Wr, or the forward-direction rotation power of the wheels Wr is input to the motors 2A, 2B.

Figure 12:
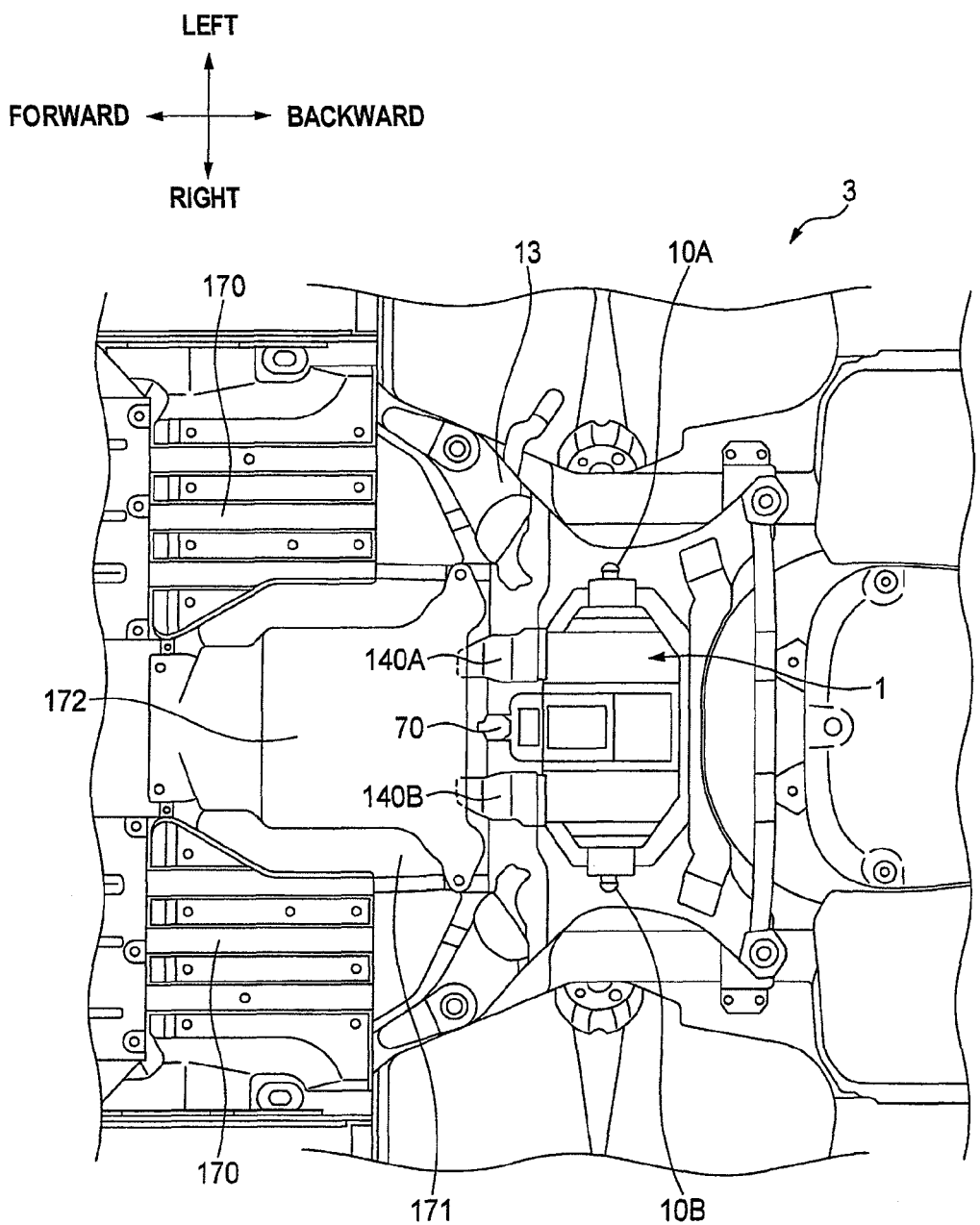
FIG. 12 is a bottom view of a vehicle, showing a state where the motor is mounted through a sub frame.

As shown in FIGS. 4 and 12, the rear wheel drive apparatus 1 is supported on a sub frame (a frame member) 13 by mount members (support devices) 13a and 13b and is fixed below the floor panel 171 of the vehicle 3. Also, by fixing the mount members 13a and 13b to boss portions (fixing portions) 11a (see FIG. 6) respectively provided on and projected forwardly from the forward side surfaces 11*f* of the case 11 (side cases 11A and 11B), the rear wheel drive apparatus 1 is supported on the vehicle 3.

Also, the left and right side cases 11A and 11B respectively include, on their forward side surfaces 11*f*, a connecting conductor, that is, first and second connectors 101A and 101B used to electrically connect bus bars 130 (inside conductors) connectable with the three-phase wires of a stator coil 102 wound on a stator 14 and conductive cables 103A, 103B (outside conductors) which are extended from external equipment (not shown).

The first and second connectors 101A, 101B are disposed below and near the boss portions 11*a* to which the mount members 13*a*, 13*b* can be fixed and, especially, they are disposed below a horizontal plane P passing through the rotation axis x of the axels 10A, 10B. Further, the first and second connectors 101A, 101B at least in part are disposed just below the mount members 13*a*, 13*b* in the vertical direction, that is, within the vertical projections of the mount members 13*a*, 13*b*; and also, they are disposed just below the sub frame 13 in the vertical direction, that is, within the vertical projection of the sub frame 13. Thus, since the mount members 13*a*, 13*b* and sub frame 13 are disposed to cover the first and second connectors 101A, 101B from above, the first and second connectors 101A, 101B can be protected against an object falling down from above.

The first and second connectors 101A, 101B are disposed near the oil pump 70 (which exists centrally of the forward side surface 11*f* of the case 11 in the lateral direction) in the lateral direction in such a manner that they sandwich the oil pump 70. Thus, the oil pump 70 is disposed not to interfere with an operation which is executed for gaining access to the first and second connectors 101A, 101B.

Also, below the connectors 101A, 101B and conductive cables 103A, 103B in the vertical direction, first and second protector members 140A and 140B for protecting the connectors 101A, 101B and conductive cables 103A, 103B are fixed to the case 11 by support members 160A, 160B respectively. Here, since the rear wheel drive apparatus 1 has symmetry with respect to the lateral direction center of the vehicle 3, in the following description, the structures of the second connector 101B, second protector member 140B situated on the right (in FIG. 4, on the left) will be described.

Figure 6:
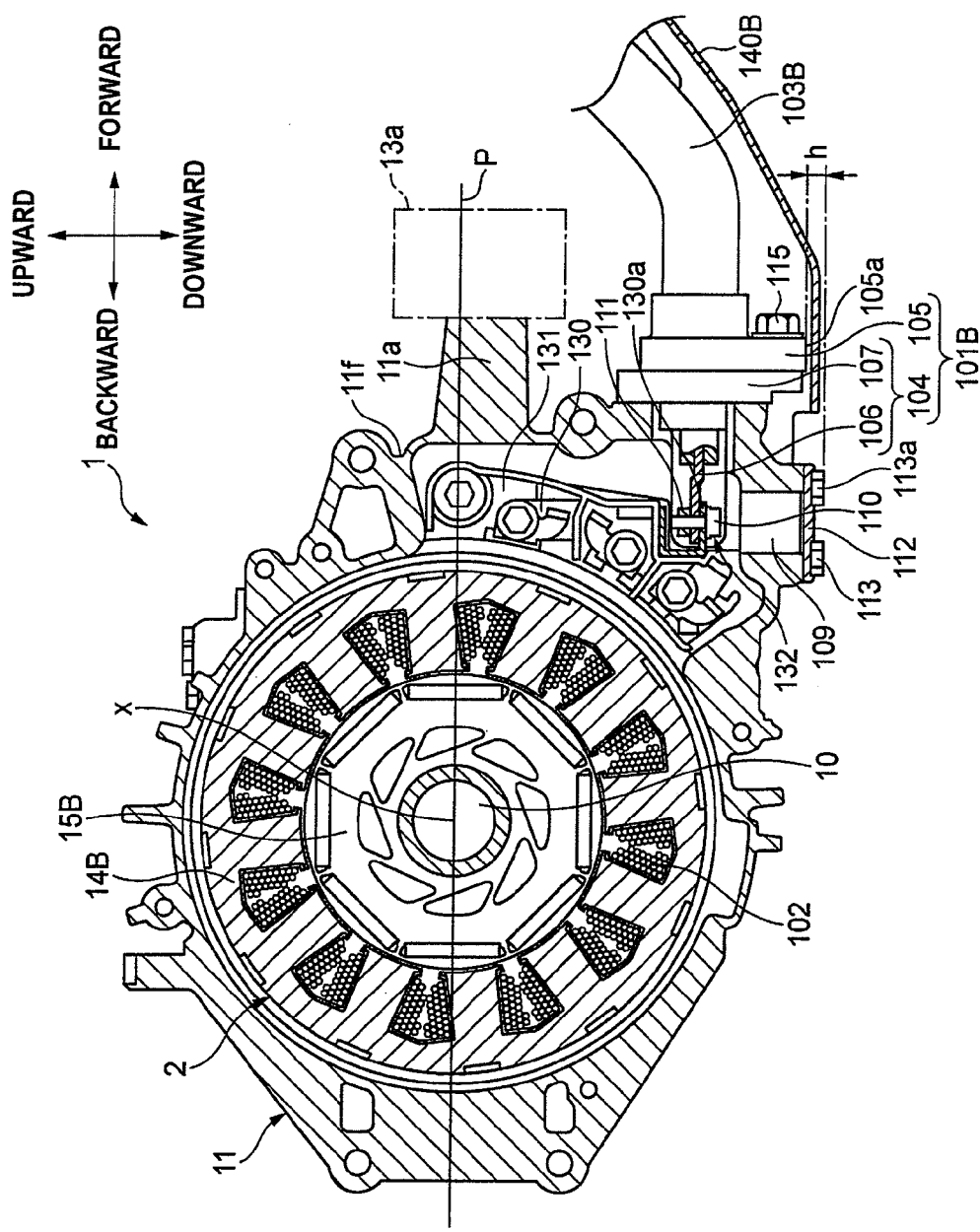
FIG. 6 is a section view of the rear wheel drive apparatus taken along the VI-VI line shown in FIG. 2.
Figure 7:
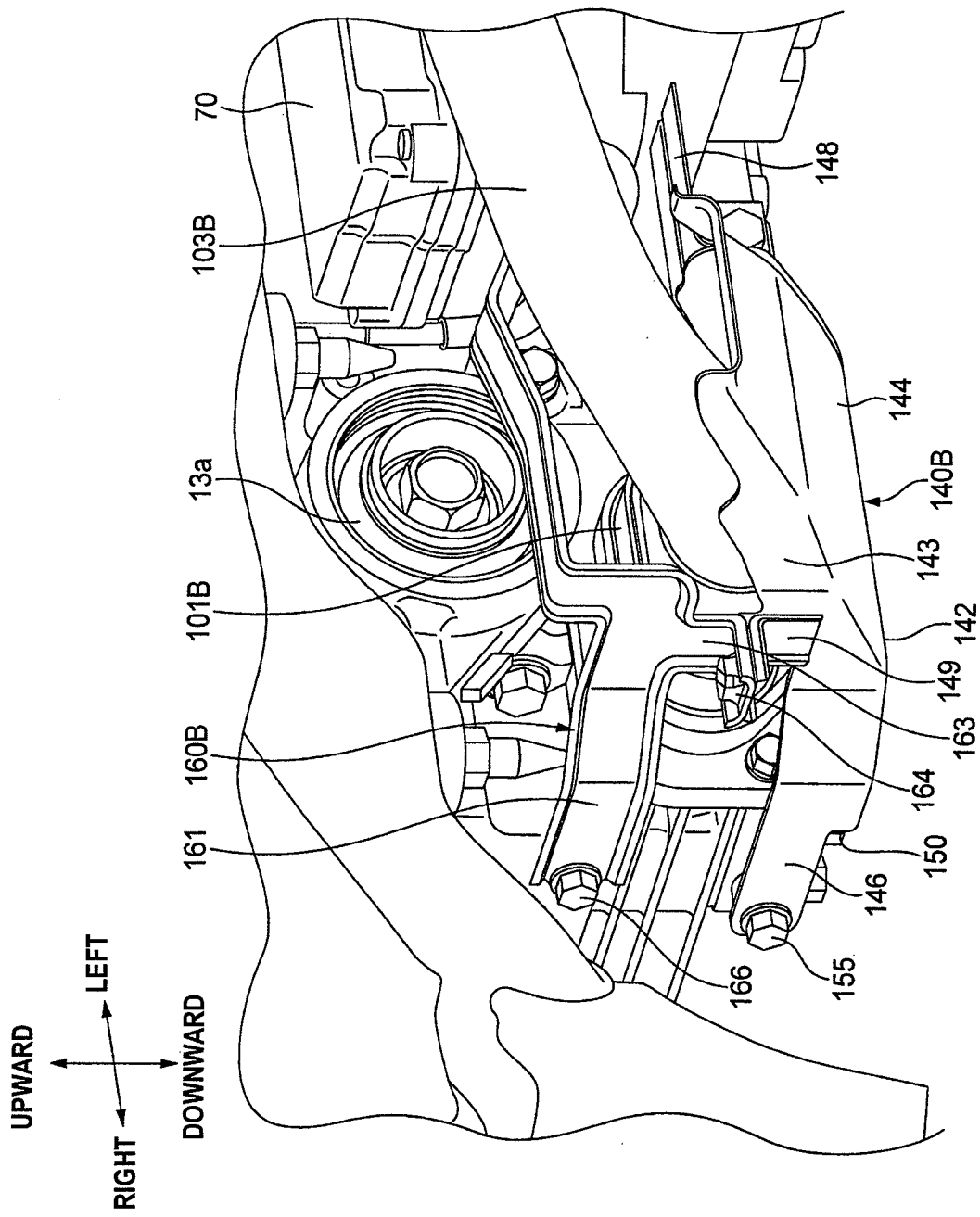
FIG. 7 is a perspective view of a connector and a protector member mounted on the case member of the motor.

Referring to FIG. 6, the second connector 101B includes an inside connector 104 to be fixed to the case 11 and an outside connector 105 to be provided on the leading end portion of the conductive cable 103B. When the inside and outside connectors 104, 105 are connected together, the bus bar 130, to which the respective-phase wires of the stator coil 102 wound on the stator 14B can be connected, and the conductive cable 103B are electrically connected to each other.

Figure 5:
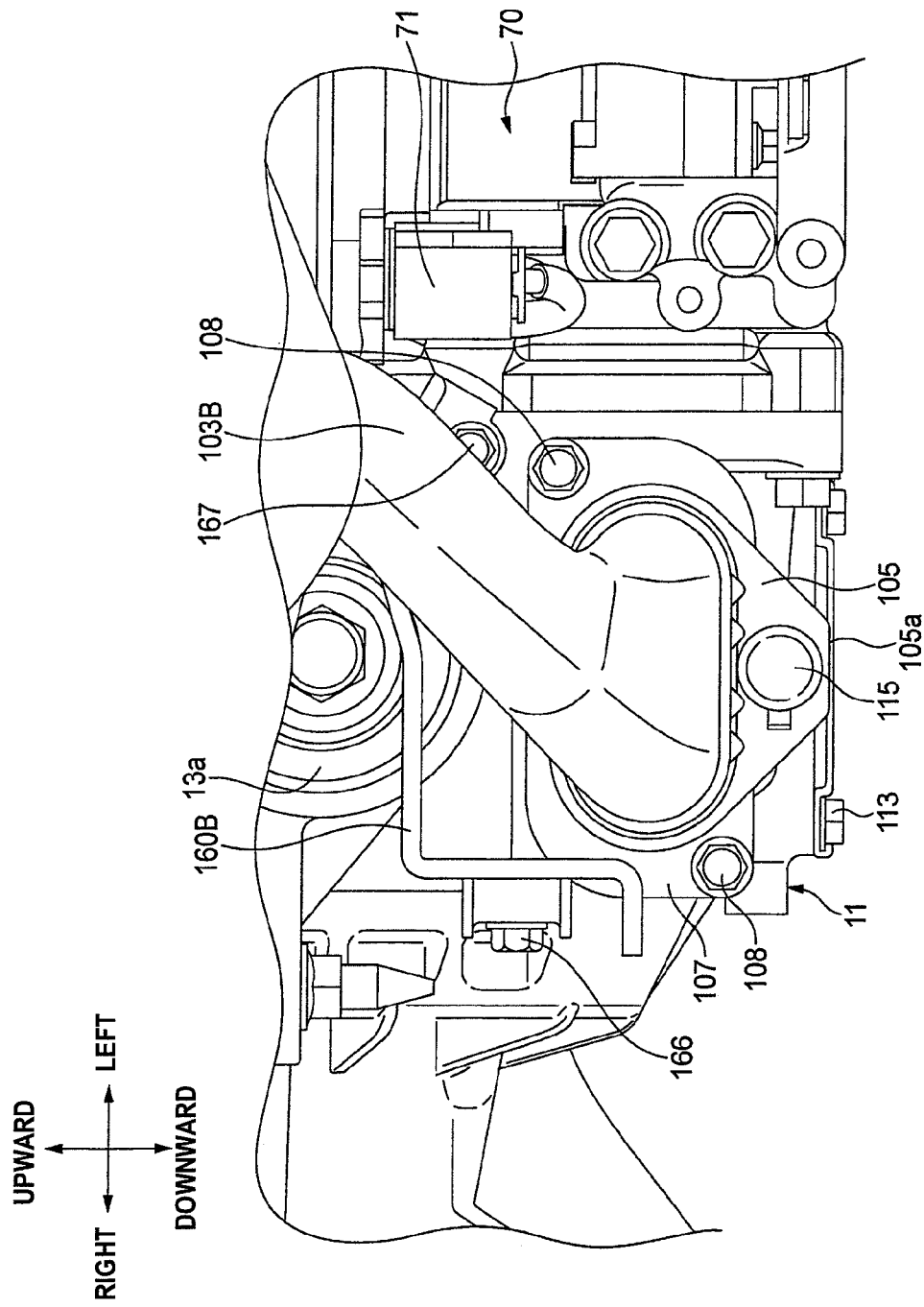
FIG. 5 is a view of a connector mounted on the case member of the motor, when viewed from front with a protective member removed therefrom.

The inside connector 104 includes three conductor main bodies 106 of a U phase, a V phase and a W phase, and a conductor hold portion 107 for holding the respective conductor main bodies 106. To mount the inside connector 104 onto the case 11, the conductor hold portion 107 may be fastened and fixed to the case 11 using two bolts 108 (see FIG. 5). The case 11 includes, between the inside connector 104 and stator 14, a terminal base 131 on which three bus bars 130 (U phase, V phase and W phase) are mounted. To the one-side ends of the respective bus bars 130, there are connected wires extended from the stator coil 102 and each having one of the phases; and, to the other end 130*a*, there are connected the respective-phase conductor main bodies 106 of the inside connector 104 (in FIG. 6, only one phase is shown).

The case 11 includes, in its lower surface where the conductor main body 106 of the inside connector 104 is disposed, an opening 109 enabling the inside and outside of the case 11 to communicate with each other. Therefore, when the inside connector 104 is mounted on the case 11, the conductor main body 106 is disposed to overlap with the other end 130*a* of the bus bar 130 in the vertical direction. And, while visually confirming the connecting portions 132 between the other ends 130*a* of the respective-phase bus bars 130 and conductor main bodies 106, a fastening tool (not shown) is inserted into the opening 109 from below, whereby a bolt 110 and a nut 111 fixed to the conductor main body 106 are fastened to each other to thereby connect the bus bar and conductor main body. Normally, the opening 109 is closed by a cover plate 112 fixed to the case 11 by a bolt 113.

And, the outside connector 105 is engaged into the conductor hold portion 107 of the inside connector 104 and is then fixed using a bolt 115. The lower-most portion of the second connector 101B, in this embodiment, the lower-most portion 105*a* of the outside connector 105 is disposed to exist higher by a height h than the lower-most portion 113*a* of the case 11, that is, the head of a bolt 113 used to fix the cover plate 112 (see FIG. 6).

The second protector member 140B is formed of a metal plate or the like into a shape having a substantially U-shaped section; and, it includes a bottom portion 142 disposed below the second connector 101B and conductive cable 103B, and two erect portions 143 respectively raised upwardly in the vehicle vertical direction from the lateral direction edges of the bottom portion 142. Thus, the lower surface portions of the second connector 101B and conductive cable 103B are covered by the bottom portion 142, while the two side surfaces thereof are covered with the erect portions 143, whereby the second connector 101B and conductive cable 103B can be protected against external force to be applied thereto from below.

The second protector member 140B extends in a direction to part away from the case 11, that is, in the forward direction. The bottom portion 142 includes an inclining section 144 inclining such that the vertical-direction height thereof increases gradually as it becomes distant from the case 11, and a width reducing portion 145 reducing in width such that the horizontal-direction width W1 distant from the case 11 becomes narrower than the horizontal-direction width W2 near the case 11. Since the protector member 140B is higher on its distant side due to the inclining section 144, small stones, water or the like splashed by the vehicle while running are hard to enter the protector member 140B. Also, since the distance between the two distant side erect portions of the protector member 140B is narrowed due to the width reducing portion 145, similarly, small stones, water or the like splashed by the vehicle while running are hard to enter the protector member 140B.

Figure 8:
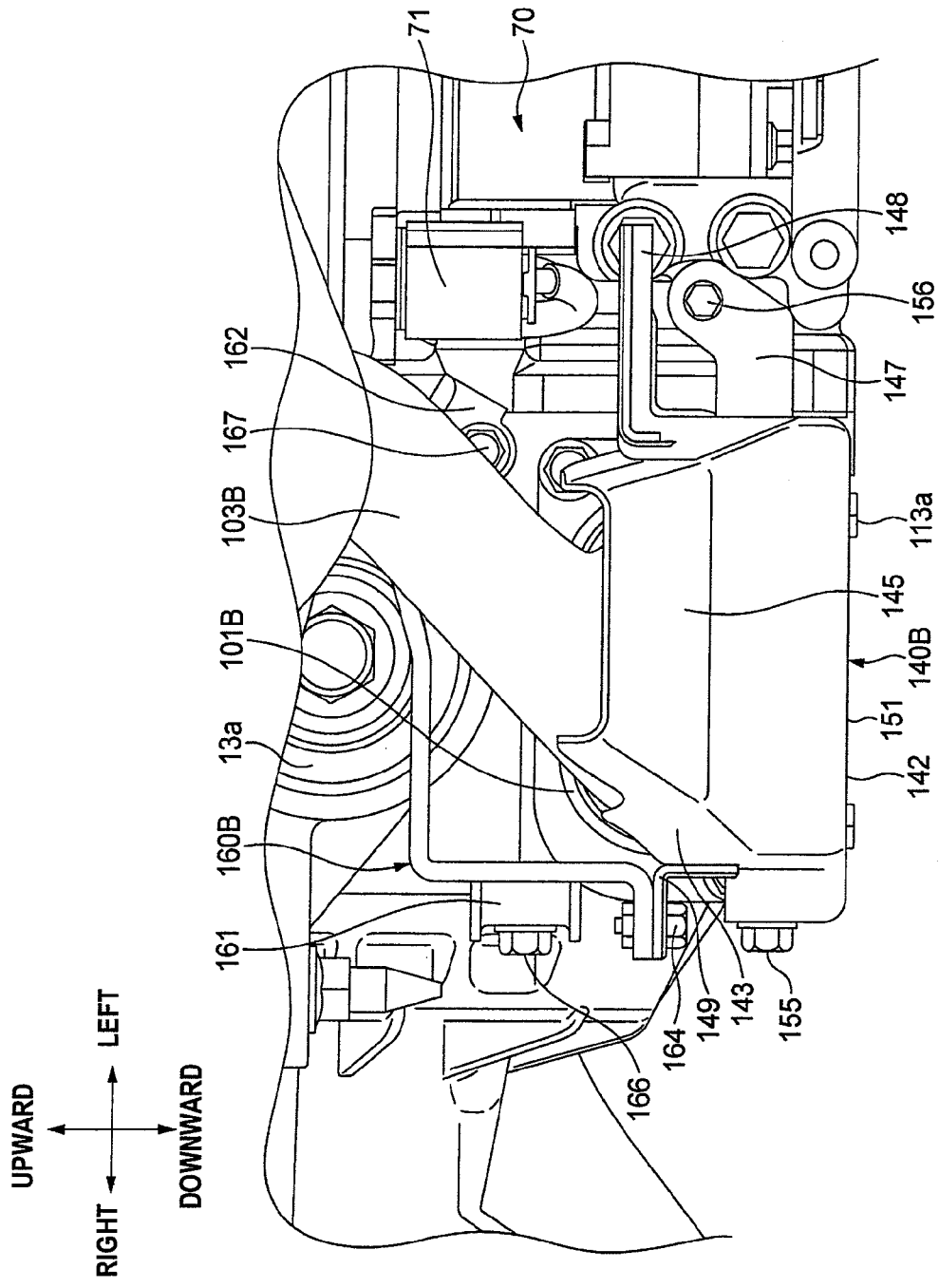
FIG. 8 is a view of the connector and protector member mounted on the case member of the motor, when viewed from front.

The second protector member 140B includes an extension portion 146 extended backwardly from the right erect portion 143 serving as the lateral-direction outside of the vehicle, and a rib 147 (see FIG. 8) bent formed perpendicularly from the left erect portion 143 serving as the lateral-direction inside of the vehicle and extended inwardly of the left erect portion 143. The extension portion 146 is fixed to the right side surface of the case 11 by a bolt 155 (see FIG. 9), while the rib 147 is fixed to the forward side surface 11*f* of the case 11 by a bolt 156 (see FIG. 8). Also, as shown in FIG. 8, the second protector member 140B further includes a coupler guard 148 formed integrally therewith and serving as an auxiliary machine protect portion, while it extends inwardly in the lateral direction of the vehicle to cover the lower portion of the wiring coupler 71 of the oil pump 70. Thus, the wiring coupler 71 is protected by the coupler guard 148.

Figure 9:
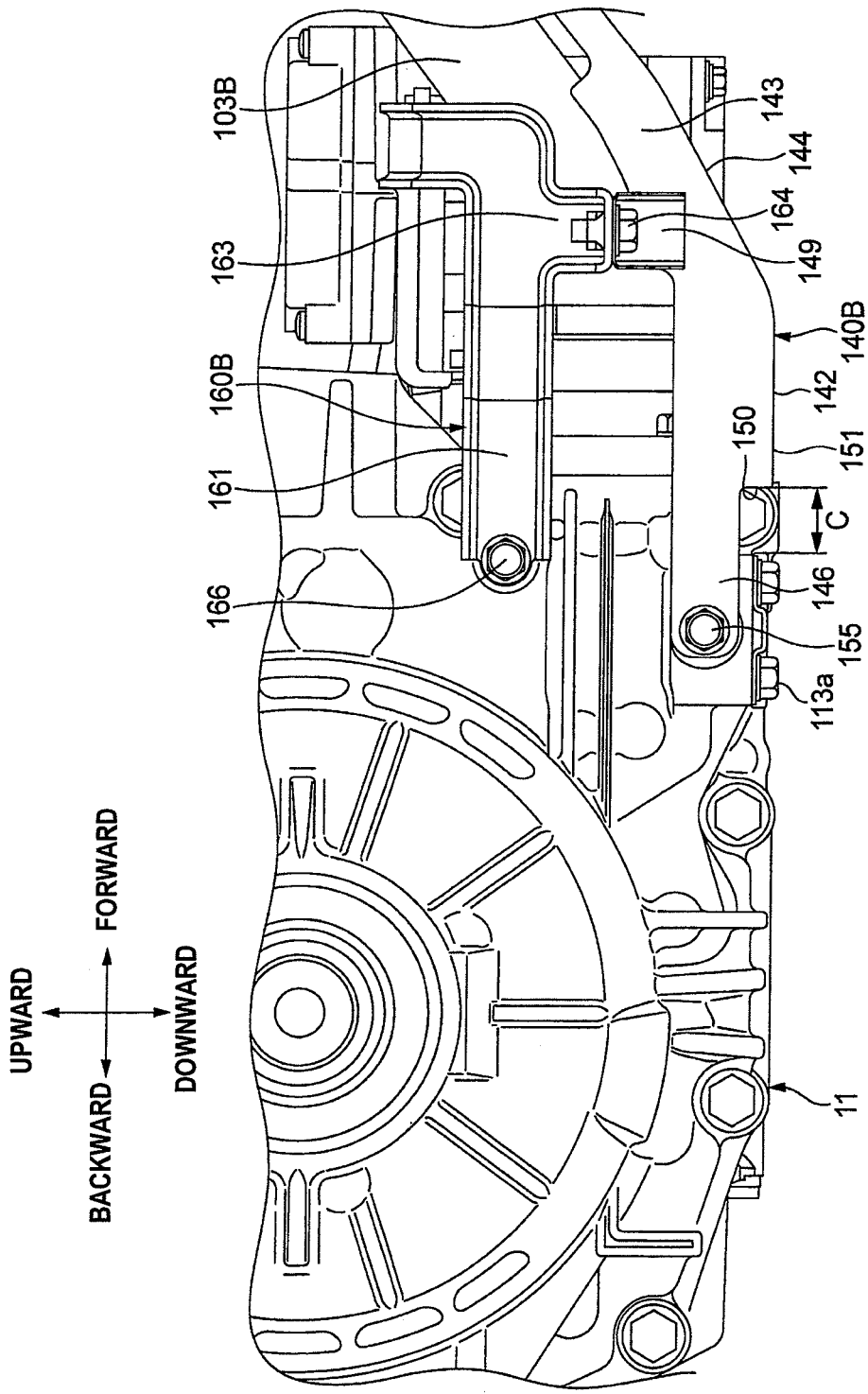
FIG. 9 is a side view of the protector member mounted on the case member of the motor.
Figure 10:
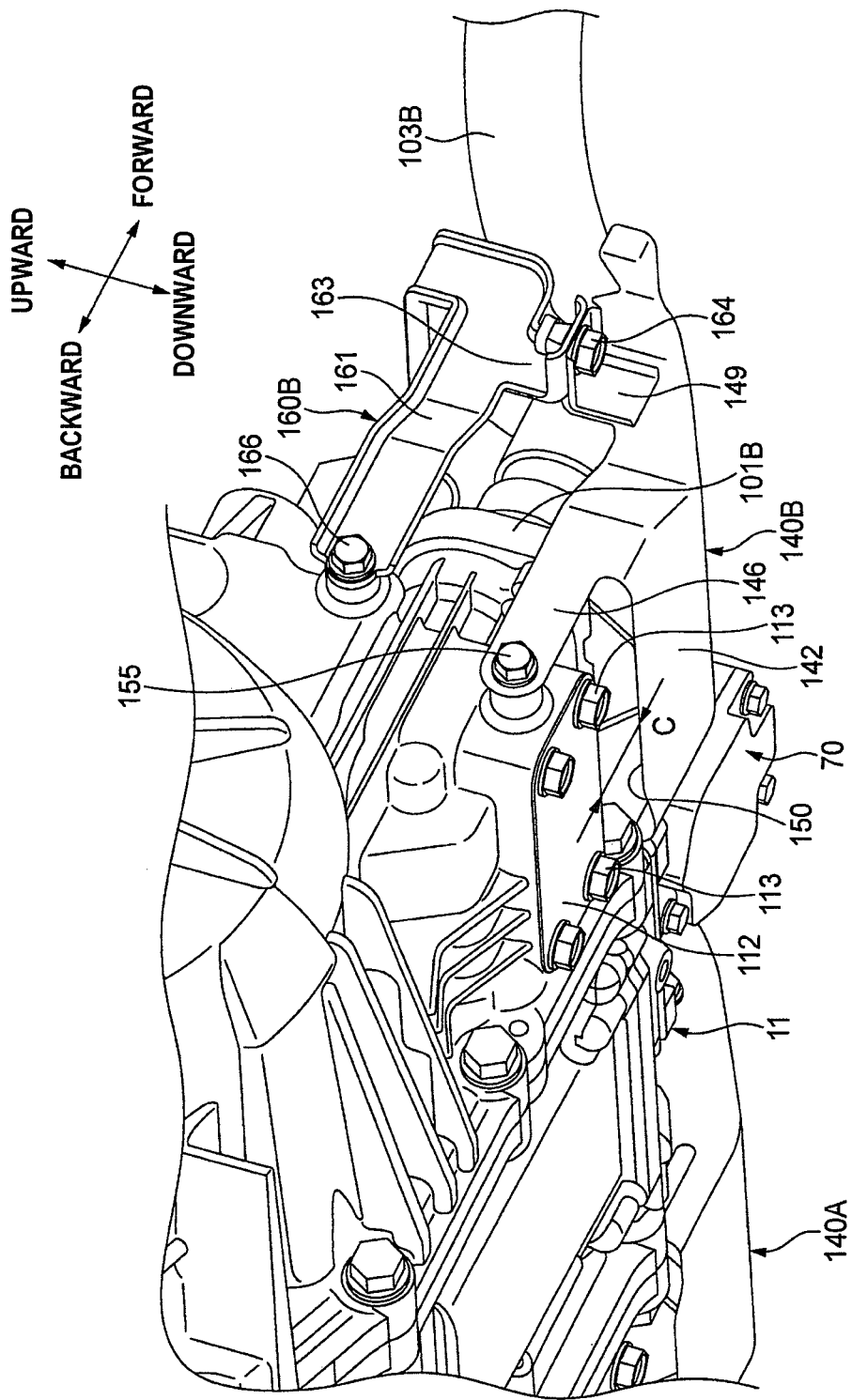
FIG. 10 is a perspective view of the protector member mounted on the case member of the motor, when viewed from obliquely backwardly below.
Figure 11:
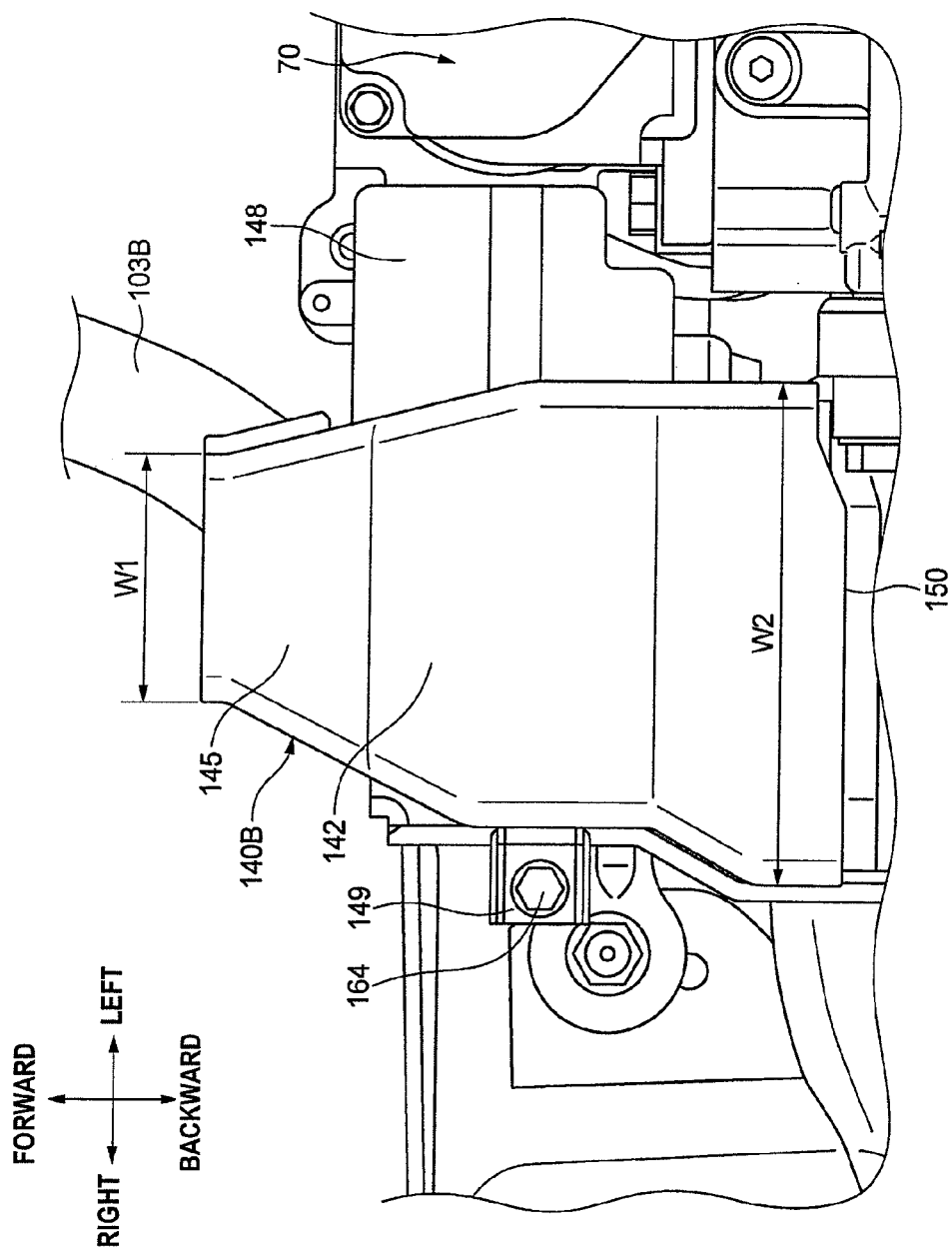
FIG. 11 is a bottom view of the protector member mounted on the case member of the motor.

As shown in FIG. 9, the second protector member 140B is disposed such that a gap C can intervene between the case 11 and the side end portion 150 thereof existing near the case 11. The gap C allows the upper and lower portions of the second protector member 140B to communicate with each other. Thus, a foreign object having entered the upper portion of the second protector member 140B can be discharged easily from the gap C.

Here, instead of forming the gap C between the second protector member 140B and case 11, a penetration hole may be opened up in the bottom portion 142 and the upper and lower portions of the second protector member 140B may be allowed to communicate with each other through this penetration hole, whereby a foreign object having entered the upper portion of the second protector member 140B can be discharged from the penetration hole.

Also, since the lower-most portion 151 of the second protector member 140B is situated higher than the lower-most portion 113a of the case 11, external force is difficult to act on the second protector member 140B (see FIG. 9).

The support member 160B is formed by press molding a metal plate into a substantially U-like shape in such a manner that it extends from one side to the other in the lateral direction of the vehicle above the second connector 101B and conductive cable 103B. The support member 160B includes one end portion 161 extended backwardly thereof. The one end portion 161 is situated on one side (in FIG. 8, on the right side) of the second connector 101B and is fixed to the right side surface of the case 11 by a bolt 166 above the fixing position between the extension portion 146 of the second protector member 140B and case 11 (see FIG. 9). The other end portion 162 of the support member 160B is situated on the other side (in FIG. 8, on the left side) of the second connector 101B and is screwed to the forward side surface 11f of the case 11 by a bolt 167.

As shown in FIG. 9, the support member 160B further includes a support portion 163 which is extended downwardly from one end portion 161 side thereof and is formed to have a substantially L-like shape. The support portion 163 is fixed by a bolt 164 to the mounting portion 149 of the second protector member 140B extended upwardly from the erect portion 143. Thus, the support member 160B is disposed to cross over the second connector 101B and conductive cable 103A and is fixed to the case 11 at two positions. And, the second protector member 140B is fixed to the case 11 at a total of three positions including the two positions of the right side surface and forward side surface 11f of the case 11 and a position where it is fixed through the support member 160B.

As shown in FIG. 12, the rear wheel drive apparatus 1 to be fixed to the lower portion of the floor panel 171 of the vehicle 3 is situated in the lower portion of the floor panel 171 and is disposed backwardly of an air flow control member 170 for controlling the air flowing under the vehicle 3 and a heat shield panel 172 for covering an exhaust pipe (not shown) extended from an engine. The first and second protector members 140A, 140B are disposed in such a manner that they do not overlap with the air flow control member 170 when viewed from below but they overlap at least in part with the heat shield plate 172 when viewed from below.

As has been described heretofore, the inside and outside connecting conductor arrangement structure of the present embodiment includes: first and second motors 2A, 2B respectively including motor main bodies having stators 14A, 14B and rotors 15A, 15B, a case 11 for storing the motor main bodies and, connectors 101A, 101B for electrically connecting the bus bars 130 provided inside the case 11 to the conductive cables 103A, 103B provided outside the case 11; and, the mount members 13a, 13b respectively fixed to the case 11 and the sub frame 13 of the vehicle 3 for supporting the motors 2A, 2B on the sub frame 13. And, since the connectors 101A, 101B are disposed below the boss portion 11a of the case 11 to which the mount members 13a, 13b are fixed, the connectors 101A, 101B can be accessed from the lower side of the vehicle 3 with the motors 2A, 2B remaining fixed to the sub frame 13, which can facilitate the assembly and maintenance of the connectors 101A, 101B and thus can enhance the operation efficiency of the structure.

Also, since the connectors 101A, 101B at least in part are disposed just below the mount members 13a, 13b in the vertical direction, impacts to be applied to the connectors 101A, 101B from above can be reduced by the mount members 13a, 13b.

Since the connectors 101A, 101B at least in part are disposed just below the sub frame 13 in the vertical direction, impacts to be applied to the connectors 101A, 101B from above can be reduced further by the sub frame 13.

Since the connectors 101A, 101B are arranged below the horizontal plane P passing through the rotation axis x of the motors 2A, 2B, the arrangement positions of the connectors 101A, 101B exist on the lower half side of the connectors 101A, 101B, whereby the connectors 101A, 101B can be accessed easily from below the motors 2A, 2B.

In a vehicle 3 the longitudinal-direction length of which is larger than the lateral-direction length thereof, since the connectors 101A, 101B are disposed on the forward side surface 11f of the case 11, when the rear wheel drive apparatus 1 is carried on the vehicle 3, the longitudinal direction is easier to provide room for a space than the lateral direction and vertical direction, whereby the connectors 101A, 101B can be arranged with no trouble.

Since the connectors 101A, 101B are disposed on the forward side surface 11f near the longitudinal direction center of the vehicle 3, when external force is input to the vehicle from the longitudinal direction due to a collision or the like, the damage of the connectors 101A, 101B can be reduced further.

Since the vehicle 3 further includes the oil pump 70 to be fixed to the case 11 and the connectors 101A, 101B are disposed near the oil pump 70 and mount members 13a, 13b, external force to be applied to the connectors 101A, 101B can be reduced by the mount members 13a, 13b and oil pump 70, thereby being able to protect the connectors 101A, 101B.

Since the oil pump 70 is disposed while avoiding portions existing just below the connectors 101A, 101B in the vertical direction, when the connector 101 is accessed from the lower side of the motors 2A, 2B, the pump oil 70 does not interfere with such access and thus does not impair the connecting operation efficiency of the connector 101.

Since the lower-most portions 105a of the connectors 101A, 101B are situated higher than the lower-most portion 113a of the case, external force to be applied to the connectors 101A and 101B from below can be reduced.

Since the motors 2A, 2B are situated lower than the floor panel 171 of the vehicle 3, even when the motors 2A, 2B are disposed under the floor, the connectors 101A, 101B can be accessed easily. This also can expand an occupant space and a loading space on the floor, while the distance between the motors 2A, 2B and wheel Wr can be reduced.

Since the case 11 includes, in its lower surface existing below the connectors 101A, 101B, the opening 109 allowing the inside and outside of the case 11 to communicate with each other and the opening 109 is formed such that it allows the visual confirmation of the connecting portion 132 for connecting together the connectors 101A, 101B and bus bars 130, the connectors 101A, 101B and bus bars 130A, 130B can be connected together from below the motors 2A, 2B.

The connectors 101A, 101B respectively include the conductor main bodies 106 and conductor hold portions 107 formed separately from the case 11 for holding the conductor main bodies 106. By fixing the conductor hold portions 107 to the case 11, the inside connectors 104 of the connectors 101A, 101B are fixed to the motors 2A, 2B. Thus, the connectors 101A, 101B can be fixed to the motors 2A, 2B while omitting the operation to insert the conductor main bodies 106 into the case 11.

The motors 2A, 2B respectively include a first motor 2A for driving the left wheel LWr of the vehicle 3 and a second motor 2B for driving the right wheel RWr; the case 11 stores the motor main body of the first motor 2A and the motor main body of the second motor 2B, and includes a mount member 13a for supporting the left side of the case 11 and a mount member 13b for supporting the right side of the case 11, while the mount members are respectively fixed to the forward surface 11f of the case 11; and, at least a portion of the connector 101A of the first motor 2A is disposed just below the mount member 13a in the vertical direction, while at least a portion of the connector 101B of the second motor 2B is disposed just below the mount member 13b in the vertical direction. This structure can prevent the vertical and lateral direction dimensions of the motors 2A and 2B from being large, thereby being able to make efficient use of space.

Since the oil pump 70 of the vehicle 3 is interposed between the connector 101A of the first motor 2A and the connector 101B of the second motor 2B and is fixed to the forward side surface 11f of the case 11, the connectors 101A and 101B can be protected by the oil pump 70 in addition to the mount members 13a and 13b. Further, the interposition of the oil pump 70 between the connectors 101A and 101B can realize the efficient arrangement of the oil pump 70.

The rear wheel drive apparatus includes: motors 2A, 2B respectively mountable on the vehicle 3 and having stators 14A, 14b and rotors 15A, 15B stored in the case 11; and, outside connectors 105A, 105B and conductive cables 103A, 103B (connecting conductors) respectively extending from the case 11 with their one-side ends connected to the bus bars 130 provided within the case 11. The outside connectors 105A, 105B and conductive cables 103A, 103B extend from the case 11 below a horizontal plane P passing through the rotation axis x of the motors 2A, 2B. The protector members 140A, 140B for covering the lower surfaces of the outside connectors 105A, 105B and conductive cables 103A, 103B are disposed below the outside connectors 105A, 105B and conductive cables 103A, 103B in the vertical direction. Thus, the protector members 140A, 140B can reduce the input of external force acting on the outside connectors 105A, 105B and conductive cables 103A, 103B to thereby be able to protect them.

The protector members 140A, 140B respectively include an inclining portion 144 which extends in a direction to part away from the case 11 and in which the vertical direction position on the remote-from-case-11 side is higher. This can reduce the entrance of a foreign object into the upper sides of the protector members 140A, 140B from the remote-from-case sides thereof. Also, in a collision or the like, it is possible to reduce the input of external force produced by peripheral members to them from the remote-from-case sides thereof.

Since the protector members 140A, 140B respectively have, on the near-to-case-11 sides thereof, a communication structure for allowing communication between the upper and lower portions of the protector members 140A, 140B, a foreign object such as a small stone or water having entered the upper sides of the protector members 140A, 140B can be discharged easily, thereby being able to reduce the stay of the foreign object in the protector members 140A, 140B. Since the foreign object having entered the protector members 140A, 140B is forced to move to the near-to-case sides thereof due to the inclination of the inclining portion 144, the foreign object is easier to be discharged from the communication structures.

The communication structure is formed by disposing the protector members 140A, 140B in such a manner that a gap C can intervene between the case 11 and the near-to-case-11 side end portions 150 of the protector members 140A, 140B. That is, the communication structure can be formed without opening up a hole in the respective protector members 140A, 140B, which can enhance the strength of the protector members 140A, 140B. Also, since the contact portions between the case 11 and protector members 140A, 140B, which provide vibration sources, are reduced, the transmission of vibrations to the protector members 140A, 140B can be reduced.

The protector members 140A, 140B respectively include: bottom portions 141 for covering the lower surfaces of the outside connectors 105A, 105B and conductive cables 103A, 103B; and, erect portions 143 extending upwardly in the vertical direction from the edges of the bottom portions 142. Thus, the erect portions 143 can be used to cover the lateral sides of the outside connectors 105A, 105B and conductive cables 103A, 103B as well, thereby being able to reduce the invasion of a foreign object into the protector members 140A, 140B from the lateral sides thereof. Also, when compared with a structure in which the protector members 140A, 140B are respectively formed in a flat plate, this structure is enhanced in strength.

The bottom portions 142 of the protector members 140A, 140B respectively include a width reducing section 145 in which a horizontal direction width W1 existing on the remote side from the case 11 reduces to be narrower than a horizontal direction with W2 on the near-to-case side. Due to the existence of the width reducing section 145, in a state where the lateral sides of the protector members 140A, 140B are covered by the erect portions 143, a foreign body is more difficult to enter the interiors of the protector members 140A, 140B.

The protector members 140A, 140B are formed separately from the case 11 and are fixed to the case 11 through support members 160A, 160B respectively formed separately from the case 11 and protector members 140A, 140B. Therefore, without being restricted by the case 11 and support members 160A, 160B, the protector members 140A, 140B can be formed to have proper shape and thickness and also can be arranged at proper positions.

The support members 160A, 160B respectively extend from one side of the outside connectors 105A, 105B and conductive cables 103A, 103B to the other side and are fixed to the case 11 on one side and on the other side. This enables the support members 160A, 160B to positively fix the protector members 140A, 140B to the case 11.

Since the lower-most portions 151 of the protector members 140A, 140B are arranged higher than the lower-most portion 113a of the case 11, an external force applied from below is received by the case 11, thereby being able to reduce the input of the external force applied to the protector members 140A, 140B.

Since the outside connectors 105A, 105B and conductive cables 103A, 103B are disposed lower than the floor panel 171 for supporting the motors 2A, 2B, access to the outside connectors 105A, 105B and conductive cables 103A, 103B from the lower side of the vehicle 3 can be facilitated.

Since the motors 2A, 23 are disposed lower than the floor panel 171 of the vehicle 3, even when the motors 2A, 2B are disposed under the floor of the vehicle, the outside connectors 105A, 105B and conductive cables 103A, 103B can be accessed easily. Also, this structure can expand an occupant space and a load space on the floor and can reduce the distance between the motors 2A, 2B and wheels Wr.

The air flow control member 170 for controlling the air flowing below the vehicle 3 is disposed substantially horizontally at a position lower than the lower-most portions 113a of the motors 2A, 2B. The protector members 140A, 140B are disposed not to overlap with the air flow control member 170 when viewed from below. Therefore, the protector members 140A, 140B, outside connectors 105A, 105B and conductive cables 103A, 103B can be accessed easily with the air flow control member 170 remaining mounted on the vehicle 3.

Here, as long as the protector members 140A, 140B can be removed with the air flow control member 170 remaining mounted, the protector members 140A, 140B and air flow control member 170 may overlap with each other.

Near the outside connectors 105A, 105B and conductive cables 103A, 103B, there is disposed the oil pump 70 to be fixed to the outer surface of the case 11, and the protector members 140A, 140B respectively include coupler guards 148 extending from the protector members 140A, 140B for covering the lower surface of the wiring coupler 71 of the oil pump 70. Therefore, the protector members 140A, 140B can also protect the wiring coupler 71. Also, when compared with a case where protector members for the outside connectors 105A, 105B and conductive cables 103A, 103B and a protector member for the oil pump 70 are provided separately, this structure can reduce the number of parts and also can simplify the mounting and removal of the protector members 140A, 140B.

Here, the invention is not limited to the above-mentioned embodiment but modifications, improvements or the like are also possible.

For example, in the embodiment, description has been given heretofore of a hybrid vehicle as a vehicle to which the invention is applied. However, the invention is not limited to this but, for example, it may also be applied to an electric vehicle using only a motor as the drive source thereof.

Also, as a support device for supporting the motors 2A, 2B on the sub frame 13, in this embodiment, there are applied the mount members 13a and 13b respectively to be fixed to the case 11 and sub frame 13. However, this is not limitative. For example, the support device may include a bracket member between a mount member and a frame member, that is, the support device may be constituted of the mount member and bracket member. Also, the case 11 may not include the boss portion 11a as in this embodiment but the mount members 13a, 13b may be fixed to the flat portion of the forward side surface 11f.

Further, in this embodiment, the connecting conductor is disposed on the forward side surface of the case. However, they may also be disposed on the rearward side surface of the case. Especially, the connecting conductor may preferably be disposed on, of the forward side surface and rearward side surface, the side surface which exists near the center in the longitudinal direction of the vehicle. When a vehicle drive apparatus including a motor is disposed in the forward portion of a vehicle, the connecting conductor may preferably be disposed on the rearward side surface of the case.

Also, the auxiliary machine of the invention is not limited to the oil pump 70 of this embodiment but it may also be a compressor for an air conditioner or a water pump.

Further, the inside conductors, outside conductors and connecting conductor of the invention is not limited to those of this embodiment but, for example, the connecting conductor may not include the connectors 101A, 101B of this embodiment but conductive cables may be inserted into the case.

Also, in this embodiment, the two motors 2A, 2B are stored within one case 11. However, the invention is not limited to this but two separate cases may be provided and the two motors 2A, 2B may be stored in their respective cases.

Further, in this embodiment, the motors 2A, 2B and left and right wheels LWr, RWr are connected together through first and second speed reducers. However, the invention is not limited to this but the motors 2A, 2B and left and right wheels LWr, RWr may also be directly connected.

In addition, in this embodiment, the motors 2A, 2B are mechanically connected to the left and right wheels LWr and RWr in such a manner that the motors can transmit power to the wheels. However, the invention is not limited to this but may be applied to a motor exclusively used for power generation.

What is claimed is:

1. An electronic motor inside-outside connecting conductor arrangement structure comprising:
    a motor including:
        a motor main body including a stator and a rotor, the rotor being disposed to be rotatable relative to the stator;
        a case member configured to store the motor main body; and
        an inside-outside connecting conductor configured to electrically connect an inside conductor disposed inside the case member and an outside conductor disposed outside the case member; and
    a support device fixed to the case member and a frame member of a vehicle, the support device being configured to support the motor on the frame member,
    wherein at least a part of the inside-outside connecting conductor is arranged directly below the support device in a vertical direction.

2. The electronic motor inside-outside connecting conductor arrangement structure according to claim 1, wherein
    at least a part of the inside-outside connecting conductor is arranged directly below the frame member in the vertical direction.

3. The electronic motor inside-outside connecting conductor arrangement structure according to claim 1, wherein
    the inside-outside connecting conductor is arranged below a horizontal plane passing through a rotation axis of the motor.

4. The electronic motor inside-outside connecting conductor arrangement structure according to claim 1, wherein:
    a longitudinal length of the vehicle is set larger than a lateral length of the vehicle; and
    the inside-outside connecting conductor is arranged on one side surface of a forward side surface and a backward side surface of the case member.

5. The electronic motor inside-outside connecting conductor arrangement structure according to claim 4, wherein
    the inside-outside connecting conductor is arranged on the one side surface of the forward side surface and the backward side surface, which is closer to a center of the vehicle in a longitudinal direction of the vehicle.

6. The electronic motor inside-outside connecting conductor arrangement structure according to claim 1, wherein:
    the vehicle includes an auxiliary machine fixed to the case member; and the inside-outside connecting conductor is arranged on a portion located near both of the auxiliary machine and the support device.

7. The electronic motor inside-outside connecting conductor arrangement structure according to claim 6, wherein
the auxiliary machine is arranged not directly below the inside-outside connecting conductor in the vertical direction.

8. The electronic motor inside-outside connecting conductor arrangement structure according to claim 1, wherein
a lower-most portion of the inside-outside connecting conductor is arranged above a lower-most portion of the case member.

9. The electronic motor inside-outside connecting conductor arrangement structure according to claim 1, wherein
the motor is arranged below a floor panel of the vehicle.

10. The electronic motor inside-outside connecting conductor arrangement structure according to claim 1, wherein:
a lower surface of the case member, which is located below the inside-outside connecting conductor, is formed with an opening formed to allow communication between an inside of the case member and an outside of the case member; and
the opening is formed to allow visual confirmation of a connecting portion, which connects the inside-outside connecting conductor with the inside conductor, the opening being formed to allow visual confirmation of the connecting portion.

11. The electronic motor inside-outside connecting conductor arrangement structure according to claim 1, wherein:
the inside-outside connecting conductor includes:
a conductor main body; and
a conductor hold portion formed separately from the case member, the conductor hold portion being configured to hold the conductor main body; and
the inside-outside connecting conductor is fixed to the motor by fixing the conductor hold portion to the case member.

12. The electronic motor inside-outside connecting conductor arrangement structure according to claim 1, wherein:
the motor includes:
a left motor arranged on a left side of a lateral direction of the vehicle, the left motor being configured to drive a left wheel of the vehicle; and
a right motor arranged on a right side of the lateral direction, the right motor being configured to drive a right wheel of the vehicle;
the case member stores a motor main body of the left motor and a motor main body of the right motor;
the support device includes:
a left side support device configured to support a left side of the case member; and
a right side support device configured to support a right side of the case member;
the left side support device and the right side support device are fixed to one side surface of a forward side surface and a backward side surface of the case member;
at least a part of the inside-outside connecting conductor corresponding to the left motor is arranged directly below the left side support device in the vertical direction; and
at least a part of the inside-outside connecting conductor corresponding to the right motor is arranged directly below the right side support device in the vertical direction.

13. The electronic motor inside-outside connecting conductor arrangement structure according to claim 12, wherein:
an auxiliary machine of the vehicle is interposed between the inside-outside connecting conductor corresponding to the left motor and the inside-outside connecting conductor corresponding to the right motor, the auxiliary machine being fixed to the one side surface.

14. The electronic motor inside-outside connecting conductor arrangement structure according to claim 1, further comprising
a protector member arranged directly below the inside-outside connecting conductor in a vertical direction, the protector member being configured to cover a lower surface of the inside-outside connecting conductor, wherein
the inside-outside connecting conductor extends from the case member at a portion located below a horizontal plane passing through a rotation axis of the motor.

15. The electronic motor inside-outside connecting conductor arrangement structure according to claim 14, wherein:
the protector member extends in a direction away from the case member; and
the protector member includes an inclining portion inclined so that a portion of the inclining portion, located far from the case member, is higher than a portion of the inclining portion, located near the case member.

16. The electronic motor inside-outside connecting conductor arrangement structure according to claim 15, wherein:
the protector member includes a communication structure configured to allow communication between an upper portion of the protector member and a lower portion of the protector member; and
the communication structure is formed on a portion of the protector member located near the case member.

17. The electronic motor inside-outside connecting conductor arrangement structure according to claim 16, wherein
the communication structure is formed by arranging the protector member so that a gap intervenes between the protector member and the case member.

18. The electronic motor inside-outside connecting conductor arrangement structure according to claim 14, wherein
the protector member includes:
a bottom portion configured to cover a lower surface of the inside-outside connecting conductor; and
an erect portion extended upwardly in the vertical direction from an edge of the bottom portion.

19. The electronic motor inside-outside connecting conductor arrangement structure according to claim 18, wherein
the bottom portion includes a width reducing section; and
a width of a portion of the width reducing section, located far from the case member, is narrower than a portion of the width reducing section, located near the case member, in a horizontal direction.

20. The electronic motor inside-outside connecting conductor arrangement structure according to claim 14, wherein
the protector member is formed separately from the case member, and is fixed to the case member through a support member; and
the support member is formed separately from the case member and the protector member.

21. The electronic motor inside-outside connecting conductor arrangement structure according to claim 20, wherein
the support member extends from one side of the inside-outside connecting conductor to the other side of the inside-outside connecting conductor, the support member being arranged above the inside-outside connecting conductor and being fixed to the case member on the one side and the other side.

22. The electronic motor inside-outside connecting conductor arrangement structure according to claim 14, wherein the lower-most portion of the protector member is arranged above the lower-most portion of the case member.

23. The electronic motor inside-outside connecting conductor arrangement structure according to claim 14, wherein:
   the motor is supported by the frame member; and
   the inside-outside connecting conductor is arranged below the frame member.

24. The electronic motor inside-outside connecting conductor arrangement structure according to claim 14, wherein the motor is arranged below a floor panel of the vehicle.

25. The electronic motor inside-outside connecting conductor arrangement structure according to claim 14, wherein
   the vehicle includes an air flow control member extending in a substantially horizontal direction, the air flow control member being arranged below the lower-most portion of the motor and being configured to control the air flowing under the vehicle; and
   at least a part of the protector member is displaced from the air flow control member in the vertical direction.

26. The electronic motor inside-outside connecting conductor arrangement structure according to claim 14, wherein:
   the vehicle includes an auxiliary machine fixed to the outer surface of the case member; and
   the protector member includes an auxiliary machine protective portion extended from the protector member, the auxiliary machine protective portion being configured to cover the lower surface of the auxiliary machine.

* * * * *